INVENTORS.
JOHN J. CONNOLLY
HAROLD F. MAY
EDWIN L. SCHMIDT
BY [signature]
ATTORNEY INVENTORS.
JOHN J. CONNOLLY
HAROLD F. MAY
EDWIN L. SCHMIDT
BY [signature]
ATTORNEY May 19, 1964 J. J. CONNOLLY ET AL 3,134,016

DATA STORAGE SYSTEM

Original Filed June 20, 1951

8 Sheets-Sheet 3

INVENTORS.
JOHN J. CONNOLLY
HAROLD F. MAY
EDWIN L. SCHMIDT

BY [signature]

ATTORNEY

INVENTORS.
JOHN J. CONNOLLY
HAROLD F. MAY
EDWIN L. SCHMIDT
BY [signature]
ATTORNEY

INVENTORS.
JOHN J. CONNOLLY
HAROLD F. MAY
EDWIN L. SCHMIDT
BY
ATTORNEY

DATA STORAGE SYSTEM

Original Filed June 20, 1951 8 Sheets-Sheet 6

INVENTORS.
JOHN J. CONNOLLY
HAROLD F. MAY
EDWIN L. SCHMIDT

BY [signature]
ATTORNEY

*INVENTORS*
JOHN J. CONNOLLY
HAROLD F. MAY
EDWIN L. SCHMIDT
BY [signature]
ATTORNEY

DATA STORAGE SYSTEM

Original Filed June 20, 1951 8 Sheets-Sheet 8

*INVENTORS*
JOHN J. CONNOLLY
HAROLD F. MAY
EDWIN L. SCHMIDT

BY N. F. Presson
ATTORNEY 3,134,016
Patented May 19, 1964

3,134,016

DATA STORAGE SYSTEM

John J. Connolly, Pacific Palisades, Calif., Edwin L. Schmidt, Katonah, N.Y., and Harold F. May, Basking Ridge, N.J., assignors to The Teleregister Corporation, Stamford, Conn.

Continuation of application Ser. No. 232,548, June 20, 1951. This application Feb. 2, 1960, Ser. No. 6,206
22 Claims. (Cl. 235—152)

This invention relates to inventory systems using rapidly accessible storage of inventory items. It is particularly adapted for use in connection with equipment which is required for meeting the demands of passenger transportation systems catering to customers who wish to make seat reservations in advance.

This application is a continuation of our application Serial No. 232,548, filed June 20, 1951, now abandoned.

In a copending application of Dale H. Nelson, Serial No. 42,356 dated August 4, 1948, now Patent No. 2,737,342, which was assigned to the assignee of the instant application, an inventory system was disclosed, the techniques of which are, to a certain extent, followed in the system herein described. The objects of that application and of this one are similar in many respects. However, the instant application is an improvement over anything heretofore known in regard to the betterment of access time for the readout of desired inventory data, also in the gaining of time for performing certain operations, such as to subtract a reservation from a previous inventory balance and to post a new balance for the seat or space inventory of a certain flight, or leg of a flight.

Another improvement which is disclosed in the instant application relates to facilities which are provided for making inquiries simultaneously as to a group of flights or a series of legs of such flights. In this connection the present system is well adapted to make use of the invention of Edwin L. Schmidt, Serial No. 161,681 filed May 12, 1950, now Patent No. 2,564,410 issued August 14, 1951, wherein there was disclosed an agent's keyset and necessary equipment for making simultaneous inquiries as to storage of inventoried items regarding a number of different flights or legs of flights.

Our invention does not absolutely require the use of the Schmidt keyset aforementioned but, because of its ready adaptation, we intend to use it in connection with the instant invention. The detailed specification to follow will assume some familiarity with the details of the Schmidt keyset.

The primary object of our invention is to provide an inventory system of the type wherein inventory balances are maintained in a continuously accessible magnetic storage unit and wherein access to a desired group of inventory balances is rapidly obtained through an initial group selection which is followed automatically by a sequential scanning of different individual balances chosen by the initial group selection.

It is another object of our invention to provide an inventory system having numerous novel and advantageous features and having electronic equipment whereby any one of a number of different modes of operation may be performed in respect to the requirements of a passenger transport reservation system. Among such operations may be mentioned the extraction of multiple items of inventory statistics in order to respond to an inquiry and to give a prospective customer a choice of available flights on any one of which he could make a reservation. Such reservations or mere inquiries, may be made, according to our invention, by the transmission of signals over signalling circuits from different control points to a single station where the storage of inventory balances is maintained and from which answer-back information may be transmitted.

Numerous other objects and advantages of our system will be brought out in the description to follow. This description is accompanied by drawings wherein:

FIGS. 1 and 2, when placed side by side, show a schematic circuit arrangement of components which are suitably coordinated for performing all the desired operations in respect to the maintenance of an inventory system of the type described;

Figure 8:
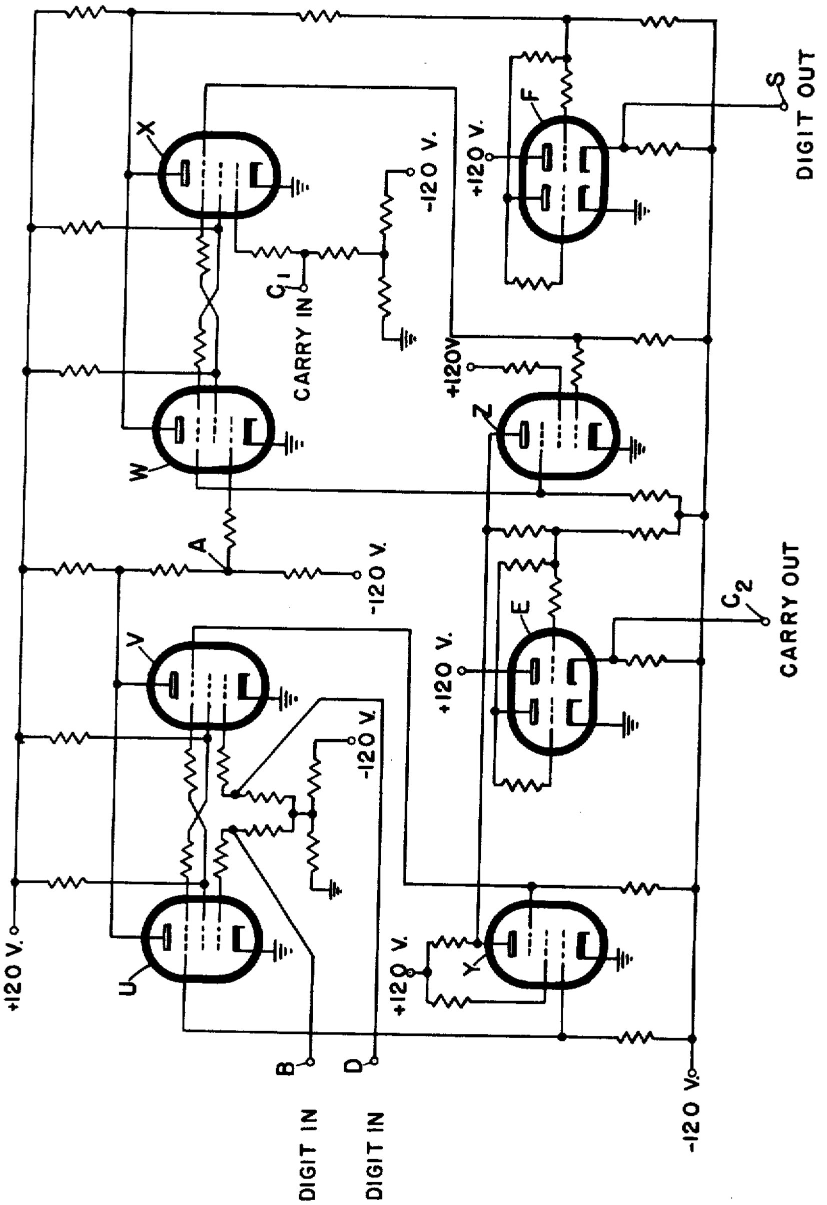
Figure 9:
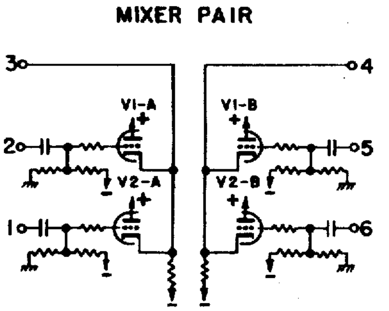
Figure 10:
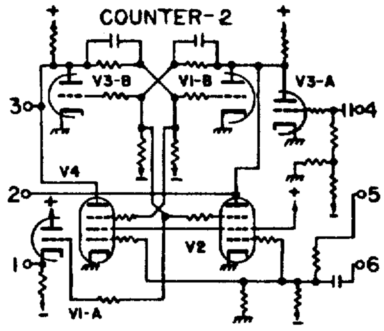
Figure 11:
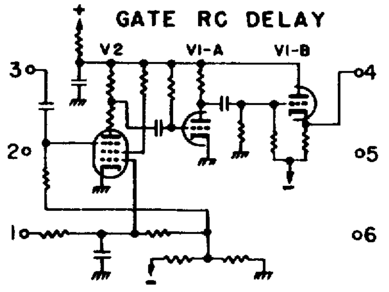
Figure 12:
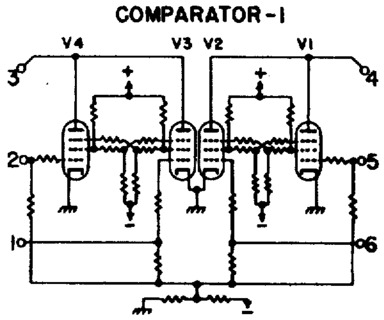
Figure 13:
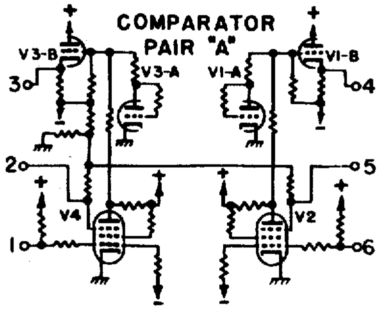
Figure 14:
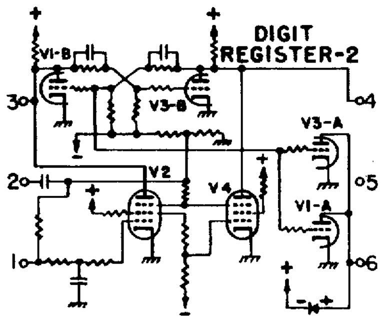

FIG. 8 is a circuit diagram showing in detail a typical digital order stage of an electronic computer; and FIGS. 9 to 14 illustrate how various of the circuit devices or sections thereof may be wired to provide standard assembly or sub-assembly units: FIG. 9 is a mixer pair; FIG. 10 shows a unit of a counting circuit; FIG. 11 is a gate unit; FIGS. 12 and 13 show comparator units; and FIG. 14 illustrates a digit register unit.

THE BASIC COMPONENTS OF THE SYSTEM

Figure 1:
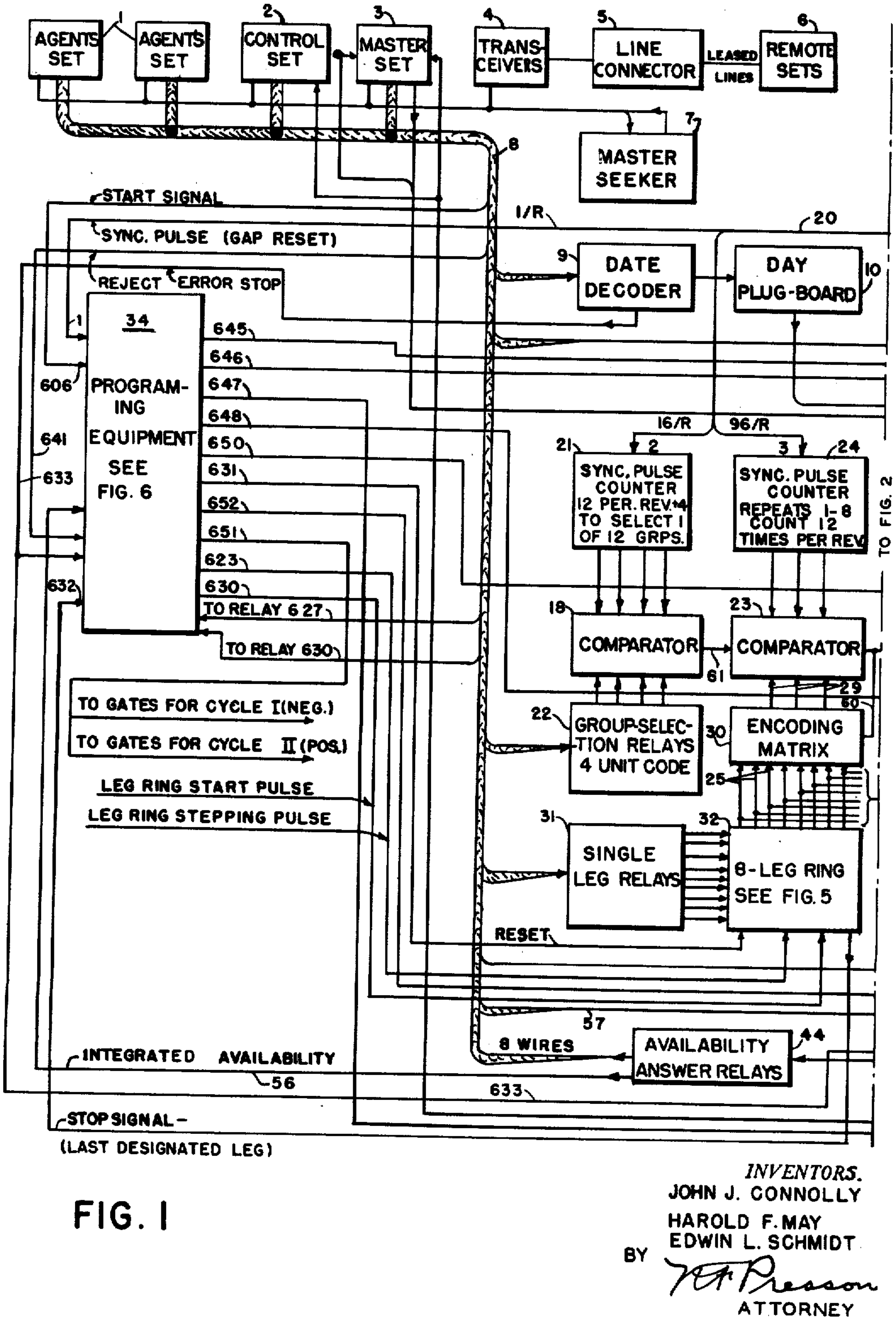
Figure 2:
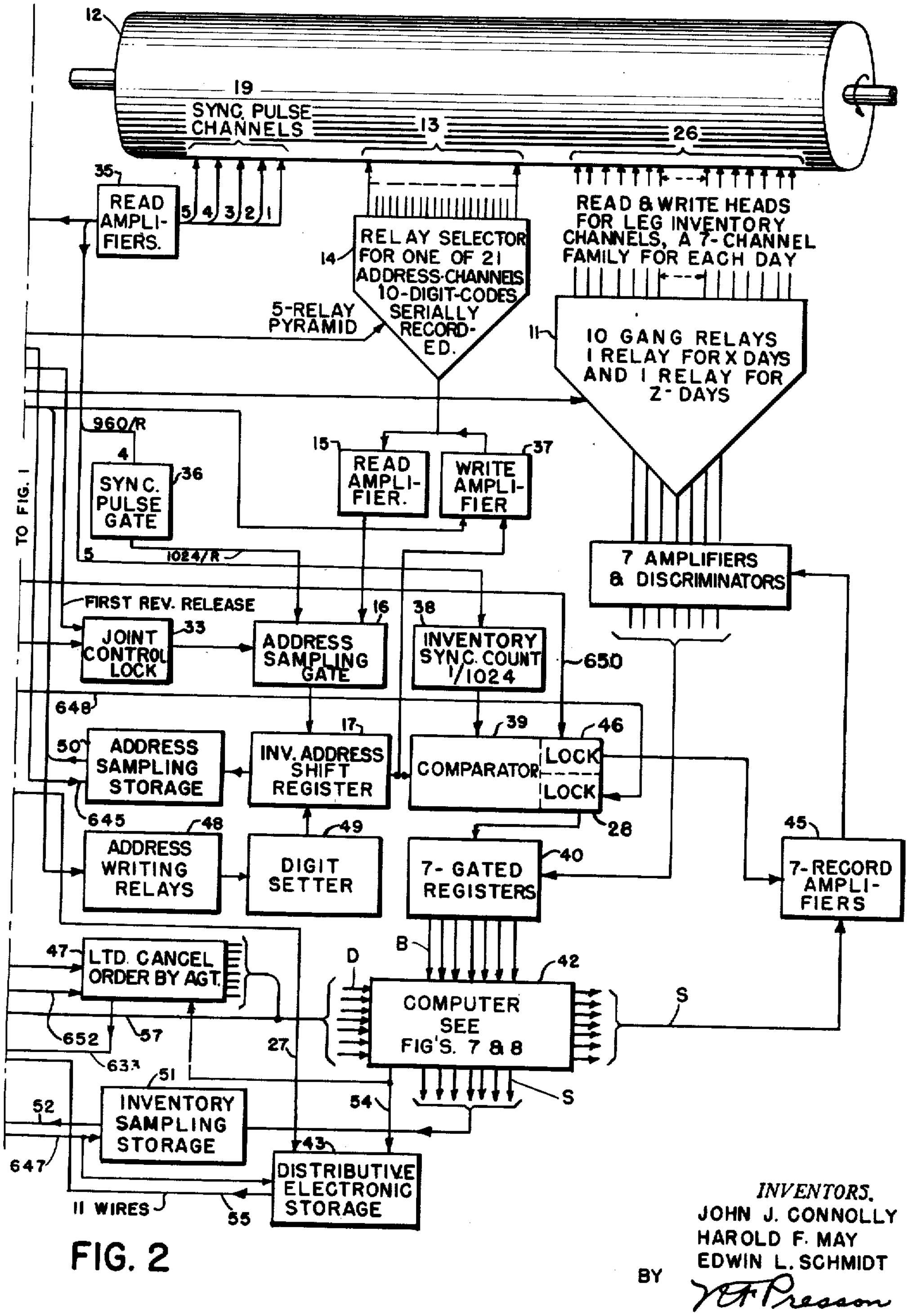

As shown in FIGS. 1 and 2, the system includes a number of different agent's sets 1 located at convenient points where customers' wants can be taken care of. There is also a master set 3 which is used for posting new inventories, as well as revised recordings of inventory item addresses, and for checking inventory balances. Another special set 2, called a "control set," is used in the flight control tower to check inventory balances immediately prior to take-off of a plane. In addition to local keysets there are remote keysets 6 which are connectable through leased lines and a line connector 5 to a selected one of several local transceivers 4 having storage facilities such as a perforated tape or relays. Any keyset or transceiver placing a call for connection to the common equipment first operates a master seeker. If there is no "busy" condition of the common equipment, then it is seized by the station making the call, all others being locked out.

Each keyset is provided with a date-key section and with keys for designating the kind of order that is to be given to the inventory system. There are also lamps on the keyset for indicating different answers that may be given automatically in response to the manner of execution of the orders by the common equipment. One of these lamps marked CHK (for Check) indicates, for example, that a sale order has been executed and an adjusted inventory balance has been posted to give effect to the transaction. This lamp is also lit to indicate the successful completion of any order. Another lamp indicates rejection of the order when, for example, the inventory balance is less than the number of seats called for by a customer. This lamp is also indicative, when lit, of any failure of the equipment to complete an order, including technical failures and errors of keyset operation, as when the agent sets up a date on his date keys for which no inventory balances are recorded.

The keysets are also provided with facilities for using code-notched designation plates of the type described in the Schmidt application above mentioned. These plates are notched along different edges so that when they are inserted in a pocket in the keyset in one of four different ways they automatically select different groups of flight inventories or leg inventories to be searched for information or to be changed when sales or cancellations are required.

The magnetic storage unit is preferably a single constantly rotating drum 12 having its cylindrical surface coated with magnetic material. In close proximity to the cylindrical surface is an array of reading and writing, or recording heads which scan record channels of three different groups. One group 19 is for deriving synchronizing pulses of different frequencies based on the revolutions of the drum. Another group 13 comprises serially recorded codes for what we call "inventory addresses." The reading of address codes enables different individual items of the inventory to be read out and to be written in at selected arcuate points around the record channels, as required for a changing inventory. As will be explained hereinafter in more detail, it is possible when putting through a single order from the agent's set to inquire as to availability of as many as eight different flights (either the same or different flights) and also to make a sale or a cancellation in respect to any individual one or more of the eight different items. The third group of record channels 26 relates to the inventory items themselves. Each inventory balance is maintained by recording a binary number and, for requirements presently contemplated, this number can be within the range of 0 to 127. Therefore a seven-unit binary code is used. Each inventory balance is recorded at one arcuate position around the drum. That is to say, the recording is in parallel along seven different channels. This is in contrast with the recording of leg addresses, where the code for each address is serially arranged in a particular one of a number of different channels.

An electronic computer of novel construction is included in the system and this computer will be given a detailed description hereinafter in connection with an explanation of its peculiar functions and its capabilities. A feature of this computer is that it will accept at one instant input signals representing all the digits of two binary numbers and at the same time deliver the result of a computation involving such numbers. Thus, when an old inventory balance is read out of magnetic storage during some portion of a magnetic drum revolution, assuming that that balance is injected into the computer along with an item to be added or subtracted, the computation is made almost instantaneously and the result is held ready to be written back into the same place on a channel of the magnetic drum from which the old inventory balance was read out. The new balance is recorded during the very next revolution of the magnetic drum.

The remaining portions of the equipment, although numerous and although coordinated in a complex manner, will best be understood in the more detailed description to follow.

DIFFERENT TYPES OF ORDERS TO BE EXECUTED

The equipment is designed to function in response to any one of ten different types of orders, as follows:

(1) *Availability inquiry.*—This is a simple request for information with regard to as many as eight different flight or leg inventory balances, particularly as to whether or not they are equal to the demand as specified in a call. The execution of this type of order involves a two-revolution scanning cycle, repeated for each of the eight legs in a selected group. In the first revolution of the drum an inventory address is read out from a selected arc of a selected recording channel on the drum, and the address is stored for finding the corresponding inventory balance record in some part of a selected inventory channel. The inventory balance item is found by this address during the second revolution and is at the same time injected into the computer. The number of seats wanted by the customer is instantly subtracted from the old balance and if the difference is not negative the answer-back signal "CHK" is given for lighting an appropriate leg-designating lamp on the agent's keyset. If the difference is negative, than the "REJ" signal is indicated by failure to light the lamp.

The current inventory balances are not disturbed by the execution of an availability inquiry order, since the read-out process does not involve erasure.

The execution of an availability inquiry order covering eight leg inventories of a selected group within the period of 16 drum revolutions is what we call a function of "Cycle I." That is to say, during the process each odd numbered revolution of the drum is devoted to the read-out of a leg address, and each even numbered revolution is devoted to the read-out of an inventory item balance. As will later be seen, other types of orders require five drum revolutions for each leg. Cycle I is then processed completely for as few or as many legs as may be involved; then Cycle II having three revolutions per leg is caused to be processed in immediate succession to Cycle I.

(2) *Selling a seat reservation.*—In this operation the preliminary searches are made for leg addresses and inventory balances during Cycle I. This cycle may be shortened, however, to cover only the number of legs involved in the customer's reservation. Then follows the processing of Cycle II with respect to the same number of designated legs. The inventory leg addresses and inventory balances are again read out, the sequence for each leg now being one which involves three drum revolutions because the new inventory balance recording is timed to occur in the third revolution.

(3) *Limited cancel orders.*—This type of cancellation is permitted by a customer-serving agent only when there is an above-zero balance in the inventory for the particular flight or leg in question. The equipment automatically rejects a cancellation order if the balance is zero, for it then becomes necessary to refer the order to the master agent or other person takes care of a waiting list by ordinary clerical methods. Our system executes limited cancel orders automatically whenever the inventory balance is 1 or greater. Cycle II processing is substantially the same as for making a sale, except that the computer is set to perform addition instead of subtraction.

(4) *Unlimited cancel orders.*—These orders are executed only by placing the call from the master agent's keyset 3. The operation is one which disregards the question of whether the current inventory balance stands at balance is 1 or greater. Cycle II processing is substanorder to record the new inventory balance resulting from the addition of the number of seats cancelled to the old balance. So each of the designated leg inventories is dealt with in three revolutions of Cycle II.

(5) *Read-out of an inventory balance.*—This order is one which can be originated only from the master keyset 3, since the indicating means for receiving the answer-back signals are included only in the master agent's set. Such means comprise an array of seven lamps (in the present embodiment of our invention) where each lamp corresponds with a different one of the binary digit orders of the inventory balance number. The read-out operation requires only the processing of Cycle I. The agents' sets 1 are not equipped for indication of the exact inventory balances since all these agents need to know is what may be given them by the "CHK" and "REJ" signals.

(6) *Writing new inventory balances.*—These orders are handled only from the master agent's set 3. The operation is similar to order No. 4, as above described, with two exceptions: (1) the old inventory balance item does not enter the computer, and (2) the processing of this order is completed in Cycle I.

(7) *Read-out of inventory addresses.*—The recording of inventory addresses may at any time require verification. The read-out signals are stored in an address sampling register 50 in fulfillment of this order. The answer-back means under control of the sampling register transmits signals to the master agent's set where lamps are selectively lit to indicate the code pattern of the address. This order is executed in Cycle I.

(8) *Write inventory addresses.*—Whenever a change is needed with respect to the particular addresses to be included in a given group, new addresses may be recorded in any selected address channel. Signal transmitting means are provided in the master agent's set 3 for doing this. The order is executed in Cycle I.

(9) *Availability inquiry regarding a date beyond a ten day limit.*—Inventories with numerical balances are maintained (according to our present embodiment of the invention) only for a ten day period. A new inventory record for the latest of the next ten days is entered in place of the record for the expiring day. For records of availability beyond the 10-day period a single channel is used to record a "1" or a "0" for showing the condition of a clerically maintained auxiliary inventory record. The magnetic record channel as used in this connection is referred to as covering "X" days. Another channel is used in a similar manner to record and give out information regarding holidays which are called "Z" days. Processing of these inquiry orders is accomplished in Cycle I.

(10) *Orders involving write-up of X and Z day information.*—The overall status of availability on each leg for X days, and also for Z days is frequently to be posted on appropriate channels of the drum in accordance with changes made in a correlative clerical inventory record. The magnetic recording of "1" for availability on all X days, or on all Z days expedites the answering of inquiries for these future dates. The magnetic recording of "0" for any leg indicates that on some one or more of the X days or Z days the seats have been sold out. The clerical record is then consulted for information regarding available space on days beyond the ten-day active period. The write-up of information on orders of this No. 10 type is handled from the master agent's set and in the same manner as for writing up new inventory balances, the No. 6 types of orders.

DEFINITIONS

In order to simplify the description, it may be well to give here a limited glossary of definitions and a brief explanation of certain functions performed by a few of the components.

*Seeker.*—This is a rotary switch used to seize the common equipment if it is not busy, and to send back a busy signal (with the aid of certain relays) if it is busy. In case the common equipment is idle at the time a call is placed, the seeker responds by causing a gang relay at the calling station to connect that station through a multiple conductor cable with all the controllable components of the common equipment and also to lock out all of the other keysets.

*Decoder.*—Decoders are generally of the type known as "relay pyramids." The code signal, as transmitted, usually relates to an individual item, so the relay pyramids designate one of a number of different outgoing circuits from a decoder as a selected circuit for any particular use.

*Day plugboard.*—This unit is in the form of a plug board whereby input and output circuits may be interconnected by manipulatable jumper cords. Selective circuit controlled by conventional day-of-the-month keys on the keyset are carried through the plug board to ten assigned day selection relays plus two relays for X and Z days.

*Transceivers.*—These are storage units for receiving messages from remote sets and for holding the intelligence until it can be used in an otherwise unoccupied time interval in connection with the common equipment. The master seeker gives access to the common equipment whenever it is freed from handling a previous order.

*Electronic counters and counting rings.*—These are well known in the art and are used in several of the components of the instant invention, including units 21, 24, 32 and 38. Each stage of the counter is a trigger circuit, sometimes called a flip-flop, or Eccles-Jordan circuit. Control, or stepping pulses are applied to the lowest order stage, and carry pulses are delivered by each stage to the next higher order stage so as to register the count progressively in binary numbers.

*Gate.*—A circuit, well known in the art, having an output and a multiplicity of inputs so designed that the output is energized when and only when a certain definite set of input conditions are met.

*Lock.*—A lock is used in somewhat the same sense as a gate, but may have only one control circuit. It is usually in the form of an electron tube, but may otherwise be a magnetic relay, provided the timing tolerances will permit.

*Delay multivibrator.*—The operational requirements of our programming equipment are such that delays of 50 micro-seconds or more must be introduced into the timing of certain functions so as to follow one another in proper sequence. The delay multivibrator is a self-restoring flip-flop circuit which yields a dynamic pulse as its output at the end of its natural cycle.

*Comparator.*—Where a code signal of one pattern is to be compared with a series of code signals having variable patterns, the comparator finds the instant of coincidence between the two patterns and delivers a gate pulse which lasts only as long as the two codes agree.

*Encoding matrix.*—This unit receives a signal as delivered to it by any one of a plurality of different circuits. It translates the single-circuit pulse into a multi-element code pattern which identifies the source of the pulse.

*Decoding matrix.*—This unit is controlled by simultaneously applied input potentials and yields a useful output potential only when there is agreement between the code pattern of said input potentials and the predetermined arrangement of the input circuit connections as chosen for detection of a particular code.

*Shift register.*—Shift registers are used to store a train of code signals. The signals are injected successively at the input stage of the register and are passed along through the register from stage to stage, the transfer taking place only at the rate of succession of the input pulses. When a code pattern is thus stored in the shift register it remains there indefinitely and its significance may be sensed at any time and repeatedly, if desired. The pulses issuing from the last stage are not used in our system and are, therefore discarded.

PROGRAMMING

The programming is of two main types. The simpler type is called Cycle I. It merely searches for information, as when availability requests are handled. The availability request always requires information with regard to eight different legs or individual flights. The address for a leg inventory is found in one revolution of the drum. In the next following revolution the inventory itself is found, and when read out it is injected into the computer. Signals representing the number of seats requested are also applied to the computer. Subtraction takes place automatically and the "answer-back" signal is given out as "CHK" or "REJ." Each of these "answer-back" signals is stored in an availability register and subsequently transmitted back to lamps on the agent's set. Cycle I therefore involves two revolutions of the drum for each of the leg inquiries. A detailed response to the eight leg availability inquiry is indicated by the selective lighting of individual lamps on the agent's set. These lamps are arranged in a row opposite designations on the coded plate which was disclosed in Schmidt's application above cited. If space is available the lamp is lit. If it is not available, the lamp remains extinguished. The reduced balance of the inventory is not recorded because, for the execution of this order, no change in the balance should be made.

In handling a sale, the programming Cycle I must be completed the same as for handling an inquiry of availability. This cycle is required particularly to operate a storage register in which there is obtained in integration of availability tests with regard to all designated legs of a multiple leg trip. Even for a single leg flight the same procedure is followed for the sake of uniformity of programming.

If the integrated availability register does not give a reject signal, then the programming unit is permitted to carry on and to execute Cycle II. During this cycle the drum makes three revolutions for each designated leg that is involved in the sales order.

Cycle II includes the following operations which are performed in successive revolutions:

*Revolution 1.*—Inventory address read-out and storage in shift register.

*Revolution 2.*—Inventory item read-out and storage in the computer, where the number of seats requested is subtracted and a CHK (or Check) signal is sent to the answer-back storage unit.

*Revolution 3.*—The new inventory balance is recorded in place of the old balance.

The performance of Cycle II, therefore, comprehends repeating the above 3-revolution operations successively for each of the designated legs. Hence, if the maximum number of eight legs were involved in selling a through ticket, then the total of drum revolutions required to execute this sale order is 40. Frequently, however, the sale of a seat reservation would involve only one to three or four legs, in which case the scanning requirements for read-out of the addresses and inventories and for writing in the new inventory balances would be restricted to five revolutions per designated leg.

The computer is so rapid in operation that it is prepared to deliver a new leg inventory balance immediately upon completing the second revolution (of Cycle II) in respect to the particular leg for which the computation is made.

Each of the orders enumerated in a previous chapter falls logically into one or the other of two categories, namely, those involving Cycle I only, and those in which it is necessary to perform Cycles I and II in succession. This last mentioned category is restricted to the following orders:

(2) Selling a seat reservation
(3) Limited cancel orders
(4) Unlimited cancel orders.

COORDINATION OF COMPONENTS

Referring now to FIGS. 1 and 2, we show therein two typical agent's sets 1, a control set 2, and a master set 3. Also there is a block representation of one or more transceivers 4, a line connector 5, and remote sets 6, which are capable of use in the same manner as the local agent's sets 1, but through connection to the transceivers (storage units) over leased lines and through the line connector 5. The master seeker 7 and its function have been described above. Circuits common to all of the agents' and control sets are connected individually to the common equipment in response to the operations of the seeker switch. These circuits are shown in the drawing to be contained in cable 8. They are distributed at the central station to the various components of the common equipment which are to be operated.

In the date-decoder 9, any one of twelve date sections of the storage equipment may be selected. The coordination between the calendar arrangement of keys in the key set and the date sections is changed from day to day, as the inventories become obsolete. Only eight wires are required to code any date but, since the inventory has to be changed with respect to obsolete information, and to substitute an entirely new inventory for a date ten days ahead, it is necessary to translate a date signal into a specific storage section of the inventory. The date-decoder 9 and the date-day plug board 10 are used for this purpose. The output of the unit 10 is constituted as a 12-wire cable leading to individual gang relays which serve to select a 7-channel family of inventory digit records to be scanned only with respect to the desired date or group of dates beyond the ten-day period. In addition to the ten days in which inventory balances are maintained for each leg, there are two additional channels of recordings, one for "X" days and the other for "Z" days. These channels are used to give "yes" and "no" answers to inquiries, but without maintaining arithmetical balances of the inventories. This simplified form of handling the "X" and "Z" day availability inquiries compares with the arithmetic method of inventory maintenance in that for "X" and "Z" days the inventory balance is either "1" or "0." When the answer is "1" it is apparent that the agent may immediately sell a reservation to his customer. If the answer is "0," it does not necessarily mean that there is no other space available, but definite information can be obtained through currently used clerical record keeping, as previously explained. Even in the case of these "X" and "Z" day reservations, considerable time is saved in answering inquiries. The common equipment operates the same for one day as for another. The day relay selector unit 11 merely switches the effects of the order execution into different ones of the twelve day-families of inventory channels on the magnetic drum 12.

The date selection having been made in the above-described manner, the number of seats requested being set up on the keyset and the agent having set into his machine a coded plate for selection of a group of legs with which the customer is interested a switch key (not shown) on the agent's set is thrown to a position for making an availability check. The agent then depresses a start key. The master seeker responds by establishing all necessary connections to the common equipment, provided the latter is not busy with another call. The code-notched selection plate, as used in the presently described embodiment, sends a nine unit-signal. Five of the code units of this signal serve to control a relay selector 14 of pyramidal form. This selector picks out one of 21 address channels to be scanned for addresses of the eight leg inventories designated by the plate. The five circuits involved are closed permutationally for operation of five individual relays in the relay pyramid. The possible permutations are thirty-two in number, but only twenty-one such permutations are used in the present embodiment. Each of these selections provides a connection between one of twenty-one address reading heads 13, through contacts of the relay pyramid 14 to a read-out amplifier 15. The output from this amplifier is deliverable through an address sampling gate 16 to an inventory address shift register 17. The sampling gate 16 restricts this read-out operation to approximately $\frac{1}{96}$ of a drum revolution. Thus each address channel has a capacity for recording 96 addresses of leg inventories. A group of eight such addresses is selected by the use of a four-unit code section of the signal transmitted by the agent's code-notched designation plate.

THE SYNCHRONIZING PULSE CHANNELS

We employ five synchronizing pulse channels 19, each to give a different number of pulses per revolution. All of the reading heads which scan these channels are generators of these synchronizing pulses and the pulses themselves are amplified in separate amplifier circuits of the group 35. The output circuits from these amplifiers are labeled according to the number of pulses per revolution of the drum, thus: 1/R; 16/R; 96/R; 960/R; 1024/R.

These output circuits are also labeled as conductors 1, 2, 3, 4 and 5, branching out from cable 20 to different portions of the system for synchronizing purposes according to the number of pulses that may be required in each revolution of the drum.

ADDRESS GROUP SELECTION FOR ONE-TWELFTH OF A REVOLUTION

In order to make this group selection, a train of synchronizing pulses is required. This train comprises 16 pulses per revolution, as generated by one of the pulse channels 19, amplified by one of the amplifiers of the group 35, and taken through conductor 2 in cable 20 to a pulse counter 21. This counter, because it has four binary digit stages, has a repetitive counting cycle of 16 steps from binary 0001 to 1111 and is reset to 0000 on counting the 16th pulse. But we need only twelve counts for address group selection. Therefore we prefer to complete the cycle by generating four pulses rapidly during a so-called "gap-time" which separates the start of a read-out period covering one revolution of the drum from the end of such a read-out period covering a previous revolution. The sole purpose of the 13th to 16th synchronizing pulse counts during the gap time is to simplify the process of re-setting the counter 21 back to the binary registration 0000.

Conductor 2 in cable 20 delivers the 16 pulses per drum revolution, 12 of which are spaced apart suitably for dividing the record portion of each address channel into 12 equal sectors, each extending through an arc of slightly less than 30°. In each of these sectors the address codes for eight different legs are recorded on drum 12.

Group selection relays of the unit 22 are locked up during the execution of any order. The code pattern thus stored is applied as a high or low voltage on each of four conductors leading to separate digital stages of an electronic comparator 18. These same stages are also fed from the output circuits of the four digital stages in the pulse counter 21. When the changing pattern of high and low output voltages from the counter matches that of the binary number stored in unit 22, the comparator attempts to operate lock 33 for releasing a sampling gate signal. But the duration of this effort is for one twelfth of a revolution of the drum. In that time eight addresses of the grouped leg inventories are scanned. So, in each drum revolution assigned to address scanning, it is necessary to select ⅛ of $1/12$ of the address channel as the sector to supply a single address for one leg inventory. The comparator 23 performs this function, and in the following manner:

ADDRESS LEG SELECTION

Each of the leg addresses in a given group is numbered 1, 2 . . . 8, and, when called for, is represented by a separate one of eight locked-up relays in the unit 31.

We prefer to carry out the process of individual leg address selection by read-out and storage of only one leg address at a time, and to replace each stored address by another during some part of every odd numbered drum revolution that occurs within the period required to execute an order.

The comparator 23 serves to find the location of a wanted address record by successively matching the output circuit voltage pattern of three counting chain digits, as delivered by the synchronizing pulse counter 24, against the static output from an encoding matrix 30 which represents the binary equivalent of an individual leg number within a selected 8-leg group. This leg number is supplied by a special counting ring 32 which normally has an 8-pulse counting cycle, but which (as will later be explained) has facilities for making a skip-selection of leg addresses so as to avoid lengthening the search to as many as sixteen, or even more revolutions of the drum. For it will later be shown that if a sale order were to be executed and the trip happened to be one covering eight legs of a single flight, then an availability search (termed Cycle I) would require two revolutions of the drum per leg and would need to be followed by what we call a Cycle II operation, where three drum revolutions per leg are required in order to (1) read out each leg address, (2) read out each leg inventory, and (3) record a revised leg inventory balance. So, if fewer than eight legs are involved in such an order, its execution can be completed during a number of drum revolutions equal to only five times the number of legs involved. Cycles I and II are both included in this reckoning.

We revert now to a consideration of how an AVAILABILITY order is to be executed. This order requires only two drum revolutions per leg, but always the full quota of eight legs. All of the 8 relays in unit 31 must be operated and must cause the counting ring 32 to take eight steps, each step being made during the gap time at the start of an odd numbered drum revolution. The necessary timing controls are supplied by the programming unit 34, as will be explained in due course. It is sufficient to state here that a reset pulse is delivered to the counting ring 32 via conductor 631 which is one of the output circuits from the program unit 34. Following the reset pulse is a start pulse delivered to the counting ring over conductor 630. Next there are stepping pulses which are delivered during gap time over conductor 623 at the start of each odd numbered revolution following the first.

When all of the relays of unit 31 are operated at the same time the counting ring 32 is thereby directed to step forward through its complete cycle and to deliver negative static pulses progressively through each of the eight conductors 25 to the encoding matrix 30. The steps of this cycle are taken at the start of each odd numbered revolution, under control of dynamic gating pulses delivered through conductor 623, but commencing at the start of the third revolution.

The circuit connections of the matrix 30 are such that it is caused to encode the representation of binary numbers successively in response to the progressive application of negative voltages to each of the conductors 25. This encoding function results in the delivery of the binary number patterns on output circuits 29 leading to the comparator 33. The pattern changes at the start of the odd numbered revolutions, the first leg designation being the binary number 001; the 7th is 111, and the 8th designation is binary number 000.

The comparator 23 functions to establish coincidence between the pattern of the three element code delivered by the encoding matrix 30 and the pattern of binary numbers 001 through 111 to 000, as composed by a synchronizing pulse counter 24.

Counter 24 operates continuously during the execution of any order. It responds to amplified read-out pulses as generated and carried through conductor 3 branching out of cable 20. There are 96 such pulses which are delivered during each revolution of the drum.

The counter 24 has a repeating cycle of eight steps and because there are 96 synchronizing pulses per revolution, the counter repeats its cycle twelve times per revolution. The binary representation of counts 001 through 111 to 000 inclusive is thus presented to the comparator 23 twelve times per revolution of the drum. Now, remembering that the binary number pattern as delivered to the comparator 23 over conductors 29 is changed only at the start of each odd numbered revolution, it will be seen that coincidence between the simultaneously presented code patterns will occur once in each twelfth of a revolution. The particular twelfth which is significant has been established, as heretofore explained, by the functioning of the comparator 18. So, with the progression of the 8-leg ring 32 through its cycle, the scanning of different leg addresses is made available in successive odd revolutions of the drum, but restricted to that twelfth of a revolution which was selected by the group selection relays 22. There is, therefore, a cooperative action in which the two comparators 18 and 23 participate for the purpose of releasing a joint control lock 33 just long enough during each odd revolution to read out one leg inventory address, and to read out a different one of eight such addresses in successive odd revolutions.

The joint control lock 33 shown in FIG. 2 is an electronic circuit arrangement which is intimately associated with the two comparator units 18 and 23 and is controlled by them. It is also subject to control by pulses coming from a matrix 615 in the program unit 34. These pulses are applied to the lock 33 over conductor 646 and cause the lock to be released only during odd revolutions of the drum. The output pulse from lock 33 persists just long enough for one leg address consisting of ten code pulses to be read out by the sampling gate 16 under control of signals from one of the reading heads 13 as fed through the amplifier 15.

THE INVENTORY ADDRESS SHIFT REGISTER

The shift register 17 was briefly described in the chapter entitled "Definitions." It is composed of ten stage electronic device into which pulses are fed successively as read out from an address channel and passed along by the address sampling gate 16. In the sampling gate the polarities of the pulses are differentiated by means of synchronizing gate pulses which are delivered at the rate of 960 per revolution, these being applied through conductor 4 of the sync. pulse channels, a read amplifier 35 and a sync. pulse gate 36. The train of ten pulses which are permitted by the joint control lock 33 to be passed along by the address sampling gate 16 become stored in the shift register 17 during odd numbered revolutions of Cycle I, or revolutions "A" of Cycle II (as will be explained later in reference to the execution of other types of orders). The code signal for each leg address remains stored in the shift register 17 throughout a subsequent revolution of the drum (Rev. B) and is then replaced by another one of the eight leg addresses until all of them have been used to locate corresponding leg inventories. The replacements are according to the timing action of the lock 33, as previously explained; each individual read-out of a leg address being from a different sector of an address channel within a selected $1/12$ of the channel circumference.

THE READ-OUT OF LEG INVENTORIES

This read-out operation is performed during even numbered revolutions of Cycle I, the execution of "Availability" orders still being under discussion. Matrix 616 in the program unit 34 delivers an enabling voltage on conductor 648 to a lock 28 for releasing a comparator 39 so that the latter will respond to the joint control of signals from an "INVENTORY SYNC. COUNT" register 38 during even numbered revolutions of the drum. This counter is advanced by sync. pulses delivered through conductor 5 of cable 20. The counter 38 is electronic and has a repeating cycle such that it will register binary numbers from 0000001 through 1111111 and at the 1024th step it will be reset to 0000000. This cycle is completed once during every revolution, but is effective only during Rev. B, as governed by the enabling voltage on conductor 648.

Like other comparators heretofore discussed, the comparator 39 functions to determine the moment of coincidence between two binary numbers. Here the code representing a leg address as stored in the shift register 17 is met by the progressively obtained binary numbers issuing from the sync. pulse counter 38. When the two numbers are matched the comparator 39 delivers a gating signal to a device 40 which is labeled "7 GATED REGISTERS." This device comprises individual flip-flop circuit elements for the seven digital stages of a binary number to be read out from the leg inventory channels. The actual read-out operation goes on continuously as a function of the "READ & WRITE HEADS" 26, scanning the leg inventory channels. Only the 7-channel family which is selected by one of the day relays 11 is effective to deliver the read-out pulses to an amplifier and discriminator unit 41 consisting of a separate amplifier and discriminator for each channel, or digit of the binary number representing an inventory balance.

The seven gated registers 40 operate simultaneously in response to gating control by the comparator 39 whenever coincidence is established between the number stored in the shift register 17 and the sync. pulse counter 38. At the instant of finding this coincidence the binary number representing the inventory balance of the desired leg is transferred to and held in the registers 40. The seven digits of this binary number are immediately presented to the computer 42 as a minuend from which a quantity representing the number of seats wanted by a prospective customer is now subtracted. The seats-wanted-number was stored in the computer 42 from the outset of executing an Availability request order.

THE COMPUTER

This computer component 42 comprises electronic equipment including individual "flip-flop" circuits for each of seven digital orders of the number representing an inventory balance, or a result of potentially changing that balance by the amount of an introduced subtrahend or addend coming from one of the keysets. When executing an Availability order, the computer delivers its results only in terms of a "Check" signal or a "Reject" signal with respect to each of the eight leg inventories of a selected group. The results are transferred through conductor 54 to an electronic storage unit 43 which is labeled "DISTRIBUTIVE ELECTRONIC STORAGE." This unit has eight separate storage elements which are successively made receptive to the signals applied through conductor 54. The distribution is under control of gating pulses delivered by the leg ring 32. With each setting of the leg ring a static voltage goes out on one of eight conductors 27 for selecting a different one of the storage elements in unit 43 to receive the "CHK" or "REJ" signal and to store the same until released as an answer-back signal train. An availability answer relay group 44 is actuated under control of the storage elements 43, and serves to transmit the answers over eight wires in cable 8 back to indicator lamps in the agent's set.

THE PROGRAMMING EQUIPMENT 34

While the block 34 has been shown in FIG. 1 to represent certain programming functions, the mode of operation of this equipment will be more clearly explained by reference to FIG. 6 which shows in block diagram form the principal components of the programming equipment.

One of the synchronizing pulse circuits includes conductor 1 in cable 20 and supplies one pulse per revolution (called a gap reset pulse) prior to each drum revolution scanning cycle. The first effective gap reset pulse is that which when delayed by 150 microseconds follows a positive start signal originated at one of the calling stations—an agent's set, for example. This start signal comes in on conductor 606 and is delivered to a so-called "set-reset flip-flop" 607. When the equipment is idle, the flip-flop circuit 607 stands set to a stable state from which it cannot be shifted by repeated delayed gap reset pulses. At the outset of receiving a call the positive start signal triggers the flip-flop 607 to the other stable state so that the following delayed gap reset pulse will restore unit 607 to its original stable state and in doing so will cause it to deliver a positive differential pulse to another set-reset flip-flop circuit 608. Unit 608 is one which is set to an "Off" stable state by a dynamic positive pulse, called a stop signal. Unit 608 is thereafter responsive to a positive differentiated pulse from unit 607 at an instant when a delayed gap reset pulse is applied to unit 607 for causing its differentiated output pulse to be positive. Unit 608 then stands at that setting for as many drum revolutions as are required to execute an order.

There are three multivibrator delay circuits 601, 602 and 603, each of which produces a delay of substantially 50 microseconds. These delay circuits intervene between the pulse input to the unit 601 and the output from unit 603. Each has a differentiated positive output pulse at the end of the delay period, as shown by the labeling of the respective output circuits as "D," for dynamic and in contradistinction to other circuits labeled "S" for static. The overall delay produced by units 601, 602 and 603 amounts to 150 microseconds and is intended to allow for various resetting and timing operations to be performed during the "gap" period of drum revolutions.

The 150 microsecond delay applied to the sync. pulse control as given to the unit 607 from the output of unit 603.

There are five units of the programming device the operation of which is subject to direct conditioning control from the unit 608, namely—gates 604, 605, 622, mixer circuit 626 and a "set-reset flip-flop" 628. These are served respectively by control circuits as follows:

*Gate 604.*—Gate 604 is one which receives a delayed dynamic synchronizing pulse once per revolution as output from the delay multivibrator unit 601. This gate 604, however, will not respond to sync. pulses until it is conditioned to do so by the static output from unit 608. Thereafter the gate 604 repeatedly delivers dynamic pulses once per revolution and with a delay of fifty microseconds during the "on" time of the programming equipment.

*Gate 605.*—Gate 605 is one which must be caused to deliver a dynamic output pulse once per revolution but delayed by 100 microseconds and repeated for as many times as required to fill an order. The conditioning of the gate 605 is effected by the positive output voltage from unit 608 which persists during the operate time of the programming device. At the start of the operate time, however, the drum makes one substantially full revolution before the first dynamic pulse out of unit 602 is transmitted through gate 605. This is due to the delay difference of 50 microseconds that separates the output pulses from unit 608 and 602 respectively.

*Gate 622.*—One branch 649 of the output circuit from unit 608 carries a static pulse to an input terminal on gate 622. This gate is thus conditioned at the start of an order execution to respond to a dynamic pulse which is delivered to another of its input terminals and comes from a mixer circuit 621. The mixer circuit is variably controlled, depending on whether Cycle I or Cycle II is to be processed, as will be explained in due course. The output circuit 623 carries a start pulse from gate 622 to the electronic counting ring 32 which has previously been described and which is used to select different leg addresses to be scanned and stored.

*Mixer circuit 626.*—This mixer circuit 626 is variably controlled, but at the start of an order it receives a dynamic pulse from unit 608 which is passed along as a reset pulse over conductor 631 to the leg ring 32. This mixer circuit also delivers its dynamic output pulse to a delay multivibrator 629, the output from which is utilized in several ways, as will be explained presently.

*Flip-flop circuit 628.*—This flip-flop circuit 628 is triggered to one side by the positive dynamic pulse applied through conductor 649 at the start of the Cycle I operation. It holds that stable state until Cycle I is completed since repetitive pulses at the start of successive revolutions have no effect. When relay 627 is operated, however, for the purpose of starting a Cycle II operation under further control of a delayed output pulse from unit 625, this delayed pulse re-sets the flip-flop to the other stable state in opposition to the setting produced by the pulse applied through conductor 649.

*Revolution counters 610 and 611.*—A fundamental function of the programming unit is to distinguish between first, second and third revolutions of the drum because of different operations which are to be performed during these revolutions. Therefore, we have a counter 610 which is also labeled $2^0$ because it gives a binary count in the first order of digits and is shifted back and forth as a flip-flop circuit every revolution to distinguish between odd and even revolution. This counter when re-set register "0" and after the first drum revolution of an order execution its stable condition is shifted to a "1" registration by a pulse from gate 605 through mixer 609.

Counter 611 is held effectively idle during Cycle I by means including the "Either Gate" 620, presently to be described. During Cycle II counter 611 responds to setting pulses from counter 610 at the end of each drum revolution to which an inventory item read-out is assigned. Since in Cycle II three drum revolutions are devoted to processing for a single leg the programming requirements of the two counters 610 and 611 involve "0" and "1" registrations as follows:

| Leg | 1 | 2 | 3 etc. |
|---|---|---|---|
| Counter 610 | 010 | 010 | 010 |
| Counter 611 | 001 | 001 | 001 |

Operatively associated with the counters 610 and 611 are inverter tubes 612 and 613, the functions of which are to reverse the polarities of the voltages delivered from counters 610 and 611 respectively.

The counters 610 and 611 and the inverters 612 and 613 are employed to set different matrices 615, 616, 617 and 618 so that each of these matrices will be enabled to deliver static outputs during operate time of the programming device where the several outputs are timed (as during Cycle II operation) to cover three different drum revolutions for scanning purposes and to utilize the approach to a fourth revolution for resetting the counters, 610 and 611. Positive output potentials from these matrices are permitted only during the operate time of the programming unit and under control of the negative static output from an inverter tube 614, the input potential for which is derived from the unit 608.

*The revolution counting matrices.*—Matrix 615 identifies the first drum revolution for each leg selection. It operates under the control of the two inverters 612 and 613, each of which has a negative output control voltage to be applied to the matrix. Matrix 616 is representative of the second revolution of the drum and is jointly controlled by the output from counter 610 and from the inverter 613. Both of these outputs must be negative during the second revolution.

Matrices 617 and 618 have no useful function during Cycle I and, in fact, they deliver no positive output pulses except when Cycle II is processed. Matrix 617 is jointly controlled by counter 611 and inverter 612, the outputs from these two units being negative during the third revolution. At the approach to the fourth revolution, matrix 618 is set to deliver a positive pulse, being jointly controlled by the output from the two counters 610 and 611. This matrix 618 performs its function of resetting the counters at the approximate start of the fourth revolution by controlling a delay multivibrator unit 619, the output from which is fed to the mixer circuit 609 and thence to one of the input circuits of counter 610, giving the latter an extra counting pulse so that it and counter 611 will both be reset to "0."

As has been explained in the foregoing part of the description, certain orders, like an availability check, can be carried out within the period of only two revolutions of the drum. In such cases, resetting of the counters is a matter of normal cycling and occurs at the end of every second revolution.

*Output circuits from the matrices.*—Matrix 615 delivers a positive potential during the odd revolutions of Cycle I, and during the first of every three revolutions of Cycle II. The differences of revolution counting as between Cycle I and Cycle II will presently be explained. They are under control of the components 628 and 620. What we are now considering, however, is the utilization of output from the several matrices under varying conditions as determined by the different orders to be executed.

The output circuit 646 from matrix 615 leads to the joint control lock 33 and serves to isolate the address sampling gate 16 from comparators 18 and 23 during even numbered revolutions (considering Cycle I operation), when the matrix output is negative; and to release the sampling pulse to the address sampling gate 16 during odd numbered revolutions, the matrix output being positive.

Matrix 615 also conditions a gate 642 to respond to dynamic pulses from gate 604 at the end of each odd numbered revolution during Cycle I and the first, fourth, seventh, etc. revolutions of Cycle II. Gate 642 has an output circuit 645 leading to an address sampling storage unit 50. When the master agent wishes to check the correctness of any leg address, his set 3 can be manipulated so as to "instruct" the address sampling storage unit 50 to send back via answer-back signals a copy of the read-out from any selected leg address. The storage unit 50 continually copies the read-out of addresses as given to the address shift register 17. The pulse from gate 642 and the instruction signal from the keyset 3 are jointly effective in selecting and timing the transmission of the answer-back signal for inventory address sampling, but the timing has to be at the end of an odd numbered revolution.

The output circuit 648 from matrix 616 leads to a lock 28, the function of which has been described in connection with the comparator 39 for the read-out of selected inventory balances during even numbered revolutions of Cycle I, or during revolutions B of Cycle II. Matrix 616 gives out a static positive voltage during these revolutions for enabling the comparator 39 to function.

Matrix 616 also conditions gate 643 to respond to dynamic pulses from gate 604 at the end of each even numbered revolution during Cycle I. Gate 643 has an output circuit 647 leading to an inventory sampling storage unit 51. When the master agent wishes to check the current reading of any leg inventory, his set 3 can be manipulated so as to "instruct" the inventory sampling storage unit 51 to send back via answer-back signals a copy of the read-out of any selected leg inventory. The read-out signals have their storage in the 7 gated registers and are injected into the computer 42 in accordance with a previously described procedure. When the master agent merely wants to make a check of inventory balances his keyset can be manipulated the same as for making an availability inquiry, except that the number of seats wanted would be zero. When subtracted from the inventory its current reading can be transferred from the computer to the inventory sampling storage unit 51 and gated out as an answer-back signals to the master agent's set 3 in which lamps are provided for setting up an indication of the binary number representing the inventory balance. The answer-back signal is transmitted at the end of an even numbered revolution of Cycle I as determined by the timing pulse from gate 604 delivered through the gate 643 to its output circuit 647, as above described.

Matrix 617 is intended to deliver a positive static potential during a third revolution of the drum, and will do so if the counting cycle is allowed to proceed beyond the second revolution. In processing Cycle I a third revolution is never reached because only two revolutions per leg are necessary. The Cycle II process involves recording new inventory balances, as derived from the computer 42 after taking the time of the second revolution to read out the old balance. Hence, the output circuit 650 from matrix 617 serves to release a lock 46, thereby to feed the output from seven gated amplifiers 45 through the multiple unit 41 and through contacts of the selected day relay 11 to the proper read-and-write-heads 26. The signals for this recording operation come from the computer 42. However, it is only when recording new inventories that result from sales and cancellation orders that Cycle II processing is necessary.

When a starting inventory balance is to be written this can be done during the second revolution upon signaling instructions from the master agent's set 3. In this case it is apparent that such instructions would, by suitable operation of a relay (not shown), disable the read-out registers 40 and would substitute the release of lock 46 during the second revolution. The binary code representing a starting inventory quantity (the seat capacity of a given plane) will then be transmitted to the computer 42 over seven wires in cable 57. The component 40 having been reset to register zero, will, in this case, enable the computer to register the start inventory as added to zero, so it will be written in by the record amplifiers without alteration.

Matrix 618, representing a fourth revolution, or revolution D has a fleeting function which, when it is performed at the end of the third revolution, results in the immediate resetting of counters 610 and 611 to zero. Matrix 618 is, therefore, suicidal. The operation is called for only during the processing of Cycle II and will be explained in more detail in a later chapter devoted to the Cycle II process.

*Programming for orders which require Cycle I only.*—For the purpose of filling an availability request order, also for filling several other types of orders, we require the programming device to operate so as to obtain a stop pulse at the end of the second revolution of the last designated leg selection. This means at the end of the 16th revolution in case of an availability order, where eight leg inventories are always interrogated. The leg addresses are searched during odd revolutions; that is, while matrix 615 delivers its positive static output. The inventories are found and read out during even numbered revolutions; that is, while matrix 616 delivers its positive static output. The stop signal which is to terminate the functioning of the programming device is in this case derived from a mixer circuit 637, under control of a dynamic pulse which is delivered as output from a delay multivibrator 625. This unit 625 receives its control from gate 624 where the latter responds to a signal delivered by the leg ring 32 after it has reached the last step of leg selection. The gate 624 is jointly controlled by this pulse on lead 632 and by the output from the "either gate" unit 620. This joint control takes place only at the end of an even-numbered revolution provided the leg ring has reached its last step. The output from gate 624 is delivered to delay multivibrator 625, thence through contact *a* of unoperated relay 627 and to the mixer 637. The output from mixer 637 is delivered as a stop signal for restoring the flip-flop circuit 608 to its program terminating condition. Thus, Cycle I is ended and the call is terminated.

*Programming for Cycle II.*—In a previous part of the specification ten different types of orders were enumerated, three of which require the operation of the system under both Cycle I and Cycle II programming. For each of these three types of orders it will now be explained how the programming equipment operates. It should be borne in mind that Cycle II operation must always be preceded by Cycle I operation, even though there may seem to be a repetition of some of the functions of these two cycles. The reason for this is it must be determined in advance of executing a sale order or a cancellation order that there is no reason for rejection of such an order. If, for example, the customer calls for transportation on a trip which has more than one leg and if a search of availability shows that some one or more of the leg inventories is exhausted, then before the programming is carried any further a reject signal will be derived automatically from the operation of the computer. This will thereupon terminate the cycling and will cause the transmission of a reject signal to the agent's set.

For the execution of any order which involves programming under both Cycle I and Cycle II, the relay 627 is operated under control of a signal from the agent's set. This relay has several functions some of which need not be discussed at this point, although one may note that the relay winding is shown in two places for convenience of locating the two contacts *a* and *b* where they may best fit the circuit arrangement.

If Cycle I only is called for, it was explained in the foregoing description that a stop signal would be passed through the mixer 637 to the set-reset flip-flop unit 608 for causing it to render gate 605 insensitive to further gap reset pulses after the leg ring has completed its leg selecting cycle.

When, however, the execution of an order requires Cycle II to follow Cycle I, then relay 627 is operated and its transfer contact *a* carries a dynamic output pulse from the unit 625 to the reset flip-flop 628 after the leg ring has completed its leg selecting cycle under Cycle I operation. The stop-signal circuit is also opened, so that Cycle II may be performed.

Assuming that a customer calls for two seats on a 3-leg flight then the agent selects the proper three leg keys of his keyset. He depresses a "2" key in a strip for designating the number of seats wanted. The date keys are also properly depressed and a code plate is selected and inserted in the receptacle of the keyset for use in making the flight and leg selections, as explained in the Schmidt application aforementioned.

The keyset having been thus prepared to give a "sell" order, the agent throws a lever key to a position marked SELL. If the common equipment is not at the moment engaged in filling another order from a different keyset, then the order under discussion will be executed in the following manner and varied only according to whether the inventory will permit the number of seats wanted to be sold, or whether the sale must be rejected due to a sold-out condition:

Since the customer wants transportation on a flight that makes only two stops between his departure point and his destination, the sale of a reservation will involve searching three designated leg inventories for availability. Cycle I programming is for this purpose, and, when a sell order is given, the search can be limited to the scanning of only the leg addresses and leg inventories involved. Under the conditions now assumed Cycle I will be carried through to completion in only six revolutions of the drum, two for each leg, provided that each leg inventory shows space to be available. The leg ring will then send its completion signal through conductor 632 to gate 624. Gate 624 is then prepared for opening by an output pulse from the so-called "either gate" 620 at the end of the next even numbered drum revolution. When gate 624 is opened at the end of Cycle I, relay 627 having been operated for a Sell order, a pulse is delivered through the delay multivibrator 625, transfer contact *a* of relay 627 and thence to the set-reset flip-flop 628, as before stated. If, however, the order cannot be filled because of insufficient space available, the stop signal will come in on conductor 56 and through contact *b* of relay 627 to gate 640, thence to mixer 637 and flip-flop 608 and will terminate the processing of the order before Cycle II is started.

The flip-flop unit 628 having been triggered causes a new control to be exercised whereby the "either gate" 620 will deliver its output pulses during the Cycle II process only at the end of every third revolution of the drum. How this is done will best be explained by reference to FIG. 4 which shows the details of the "either gate" 620 that appears in FIG. 6 only as a "black box."

*The "either gate" with lock 620*.—This gate derives its name from the fact that it functions in either of two ways. During Cycle I it is required to deliver a stepping pulse to the leg ring after every even numbered revolution. During Cycle II the same stepping pulse must be delivered only after every third revolution of the drum.

Gate 620 comprises two pentode tubes 401 and 402 and three triodes 403, 404 and 405, two of which may be enclosed in the same envelope if desired. An unused triode is shown to be enveloped with triode 405 merely because in the design of the equipment twin triode tubes have been adopted as a standard.

Figure 4:
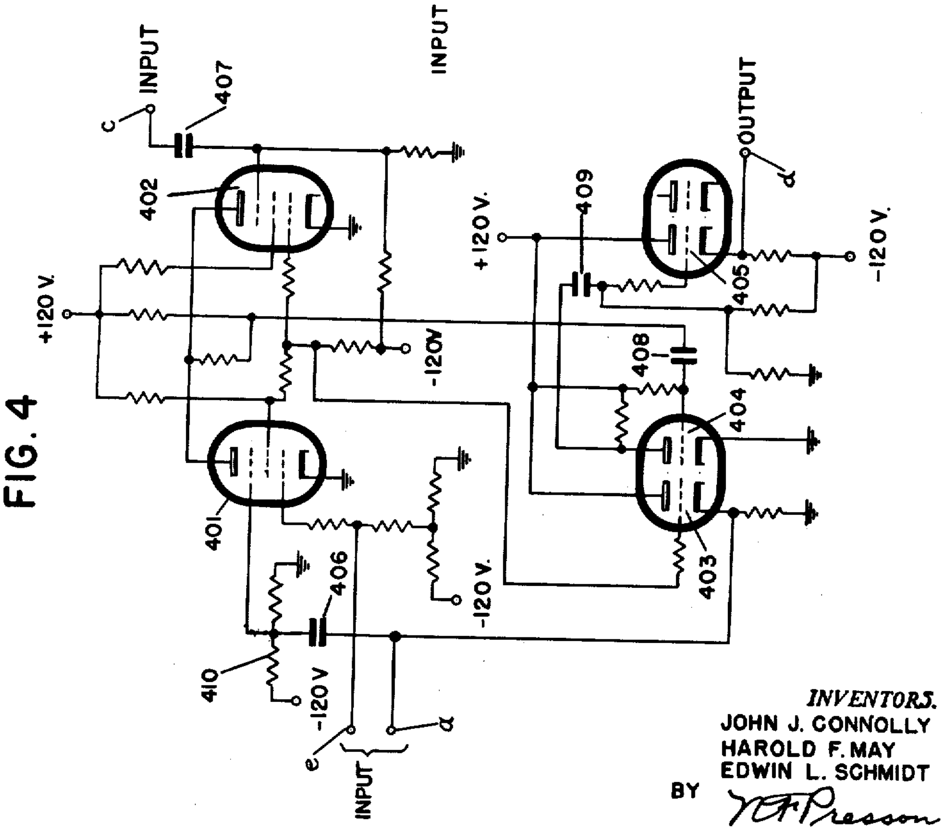
FIG. 4 is a circuit diagram showing details of a special form of electronic gate with lock.
Figure 6:
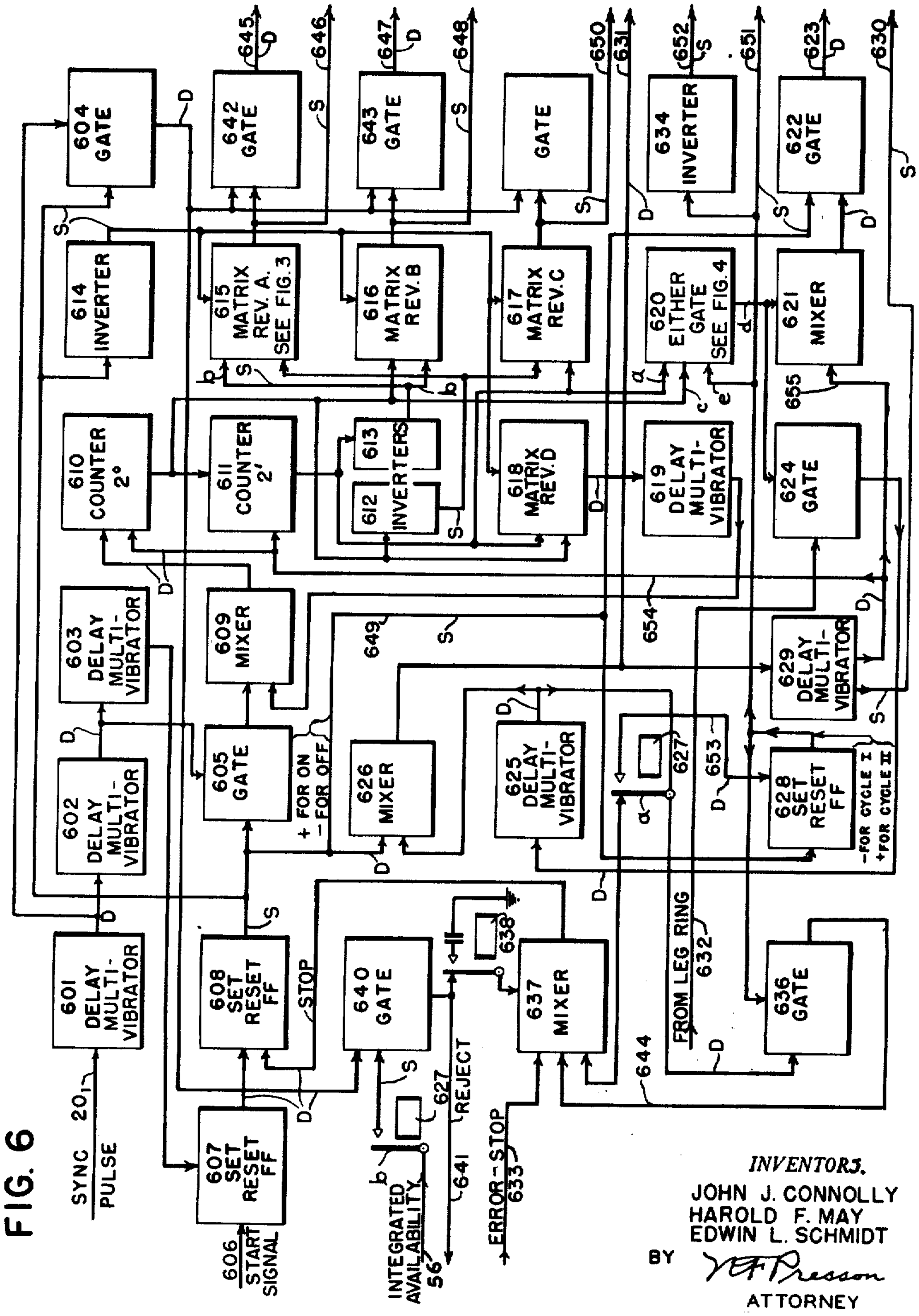
FIG. 6 is a block diagram showing components of a programming section of our system.

There are three input terminals *a*, *c* and *e* which are correspondingly indicated in FIGS. 4 and 6. The output terminal *d* also appears in both figures. The usual operating potentials, +120 volts, −120 volts and a neutral ground are also indicated together with capacitors, resistors and voltage dividers, all according to conventions which need no explanation.

This "either gate," during the processing of Cycle I is controlled by positive dynamic pulses derived from counter 610 at the start of the odd numbered revolutions. The pulses are applied at input terminal *c* of the gate. At the input terminal *e* a static negative voltage is applied from the flip-flop circuit 628 throughout Cycle I operation. This maintains a non-conductive state in pentode 401 so that the screen grid voltage therein is high, causing the first grid of pentode 402 and the control grid of triode 403 both to produce conduction. The cathode of triode 403 is then driven positive and operates to lock out the application of positive pulses through capacitor 406 to the third grid of pentode 401. Pentode 402, because of its conductive state at least as far as the screen grid, is subject to control by positive dynamic input signals applied to its third grid. When so applied the anode potential drops sufficiently to impress a blocking potential on the normally conductive triode 404. This is an inverter wherein variations of anode potential are used to control a cathode follower 405 which is normally blocked. So, under dynamic pulse control, as applied to terminal *c*, the "either gate" 620 functions to deliver output pulses from terminal *d* during Cycle I at the end of every even numbered revolution. These output pulses are utilized by the mixer 621 and the gate 622 to deliver stepping pulses over conductor 623 to the leg ring 32, as has previously been explained. Gate 624 also utilizes the output from gate 620 at the end of Cycle I, as indicated by the delivery of the signal over conductor 632 from the leg ring, and as previously explained.

Another function performed by the negative voltage output from flip-flop circuit 628 during Cycle I and applied to terminal *e* of the gate-lock 620 is explained as follows: This negative, voltage blocking pentode 401 and driving triode 403 conductive, holds terminal *a* of gate 620 positive, as previously explained. Furthermore, the positive voltage is fed back from terminal *a* through the output circuit of counter 611 to the input terminal of the inverter 613 and to the input sides of matrices 617 and 618. These three units are, therefore, held inoperative during Cycle I. This is desirable for their functions are performed only in connection with the processing of Cycle II. However, the output of the inverter 613 during Cycle I is held negative as applied to terminals *b* of matrices 615 and 616, the same as though inverter 613 received its control solely from counter 611. The normal representation of odd revolutions by matrix 615 and even revolutions by matrix 616 is therefore, not disturbed by the fact that inverter 613 is inoperative.

The triggering of the flip-flop circuit 628 at the end of Cycle I (as previously explained) when Cycle II is to follow, enables the "either gate" 620 to operate so as to deliver a dynamic output pulse only at the end of every third revolution. The voltage now steadily applied to terminal *e*, and for the duration of Cycle II, is positive. This renders pentode 401 conductive at least as far as to its screen grid, dropping the potential of the screen grid so as to block the pentode 402 and the triode 403. Pentode 401 is thus enabled to respond to pulses applied at terminal *a* from counter 611. Matrix 617 at the start of the third revolution is set to deliver a + voltage through conductor 650 for releasing the lock 46 whereby new inventories are caused to be recorded during the third revolution of Cycle II.

It is important to observe at this point that the output from counter 611 has four effects—(1) the dynamic pulse effect on pentode 401 which is positive at the attempted start of a fourth revolution (substantially the end of the third revolution) and causes the "either gate" to have its inverter 404 blocked and its cathode follower 405 made conductive, thus delivering the dynamic pulse to terminal *d* after third revolutions of Cycle II instead of after second revolutions of Cycle I, but for the same functional requirements. The reference to a fourth revolution as having an attempted start means that there is no true fourth revolution because as soon as its start is indicated by the output from matrix 618 (revolution D) that output itself after going through the multivibrator 619 and mixer 609 supplies an extra counting pulse to the counter 610, and restores the two counters 610 and 611 to their initial 00 setting at which they both deliver output potentials for a new first revolution.

Effect (2) of the changing output from counter 611 is static. This output is + during the first two revolutions and causes inverter 613 to apply negative controls to input terminals *b* of matrices 615 and 616 so that the latter will alternately deliver + output pulses in response to control by counter 610. Effect (3) is to deliver a static negative voltage to one of the input circuits of matrix 617 throughout the third revolution so that its output may be utilized as explained in an earlier part of this specification. Effect (4) is also static. Jointly with negative voltage from counter 610 at the attempted start of the fourth revolution matrix 618 is caused to deliver the + output pulse which re-sets the counters 610 and 611 substantially at the end of the third revolution.

*Termination of the Cycle II process.*—After the leg ring 32 has been stepped to the last designated leg position and rested there for three revolutions of the drum, we have a condition at which Cycle II must be ended. Three factors are coincident at this time: (1) Relay 627 remains operated so that the stop signal cannot go through to mixer 637 as was provided for terminating Cycle I. (2) The leg ring has delivered its "Last designated leg" signal through conductor 632 to gate 624, and (3) gate 636 has been conditioned to operate by the positive potential output from flip-flop 628. Therefore when the either gate 620 delivers the next output pulse as an indication of the end of the third revolution for the last designated leg, that pulse is directed by gate 624 through unit 625 and through gate 636 to the mixer 637 from which it goes to the set-reset flip-flop 608 for resetting the same. This terminates the Cycle II process.

INVENTORY ADDRESS SELECTOR

It has been indicated in the foregoing description that when selling orders and cancellation orders are to be executed, the particular legs involved in such transactions may be individually selected so as to determine the scanning times for individual leg addresses as serially disposed around the circumference of the address channels. Accordingly, the leg address selector 32 and, in cooperation therewith, the encoding matrix 30 and the comparator 23 are arranged to make skip selections, thereby to reduce the number of drum revolutions necessary to obtain all the wanted leg addresses for satisfying any given order. The inventory address selector has eight individual output circuits 23 which cyclically control the composition of different 3-element codes by the encoding matrix 30. Thus the sampling gate 16 is caused to open only when designated leg addresses are to be read out to the inventory address shift register 17.

Figure 5:
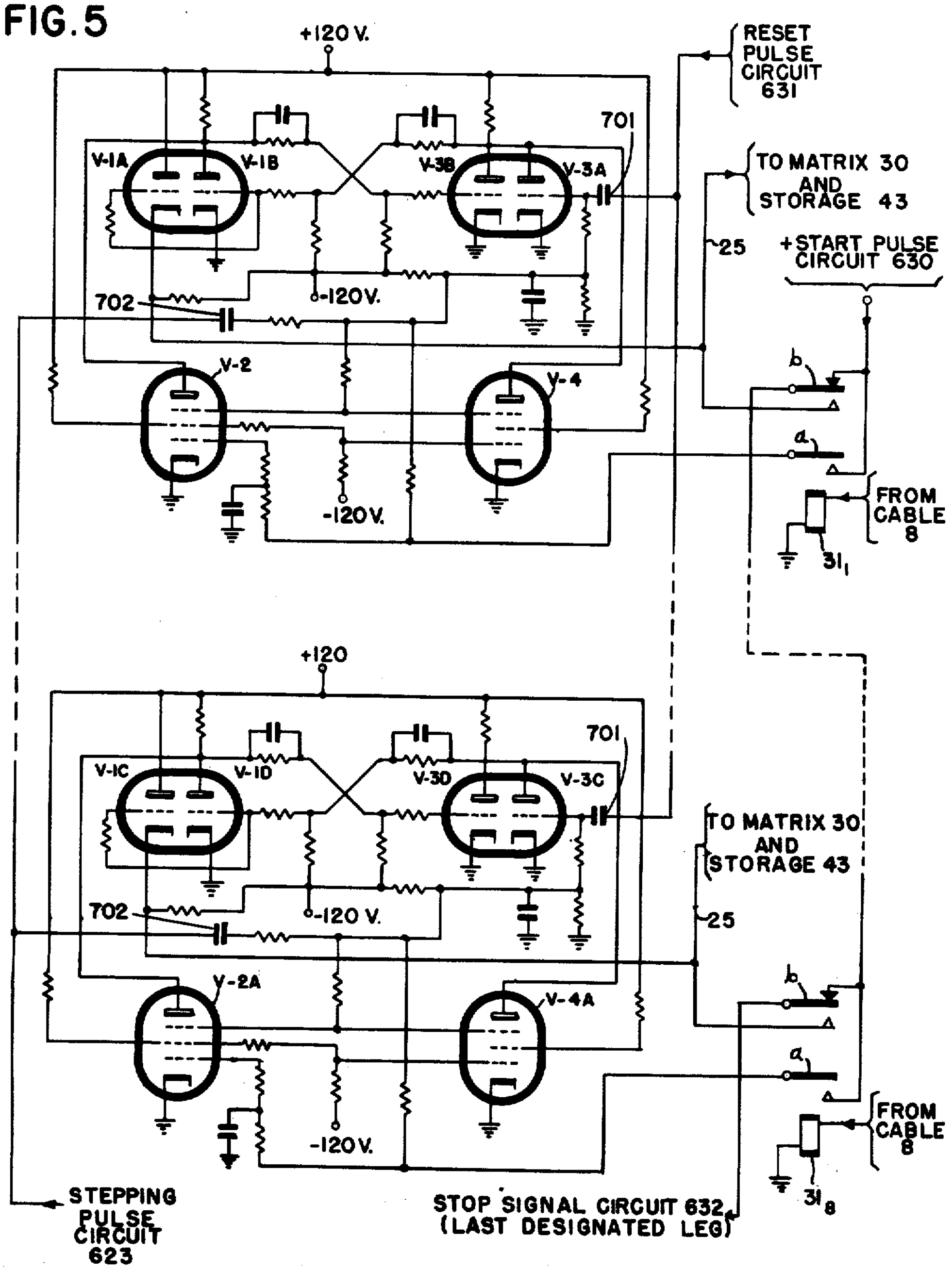
FIG. 5 is a schematic diagram of a preferred form of counting ring which is operable as a sequence switch and is capable of selecting eight circuits sequentially or is otherwise operable to make skip selections for economy of time.

FIG. 5 shows two stages of the eight-leg ring 32 with associated relays 31, whereby the designated legs are selected. Only the first and last stages of the ring are shown, since it will be understood that the intervening stages have similar circuit arrangements. In each stage two thin triode tubes and two pentode tubes are used. In the first stage the individual triodes are V–1B and V–3B, which are included in a flip-flop circuit, also a reset device V–3A and a cathode follower V–1A. The tube complement of the first stage further includes two pentode tubes V–2 and V–4 called digit setters.

Tubes V–2 and V–4 are alternately conductive if the first stage is selected by relay 31$_1$ and when responding to stepping pulses. The first stepping pulse comes in on conductor 623 at the end of the second drum revolution after a start pulse is received on circuit 630. The second stepping pulse activates tube V–4 and resets this stage to normal.

At the start of the first revolution a reset pulse is received on circuit 631 and is applied through capacitors 501 to triodes V–3A and the like in each stage. This pulse serves (by making triode V–3A conductive) to reset the flip-flop tubes, thus giving the entire leg ring 32 a "clean slate." Triode V–1B is then blocked and V–3B is made conductive. Cathode follower V–1A output is low—about—20 to −30 volts.

If leg address #1 is to be selected, relay 31$_1$ must be operated from the keyset in order to actuate stage #1 of the address selector ring. Then the start pulse coming in on circuit 630 drives the first grid in tube V–2 positive. The screen grid of this tube will then have a lowered + potential and will cause tube V–4 to be completely blocked. Tube V–2, however, will stand conditioned to respond to the first stepping pulse received on circuit 623. No other tube of the V–2 series in other stages will be so conditioned.

The stepping pulse is applied to the 3rd grids of all pentodes, all stages, but has no effect except in the one tube V–2 which has been selected, and in the V–4 tubes of the remaining stages. The anode of tube V–2 with reduced + potential blocks triode V–3B in the flip-flop circuit of the first stage. This action drives triode V–1B conductive.

The cathode follower V–1A is also controlled by the non-conductive state in triode V–3B and is driven conductive. Its cathode is connected to one of the output circuits 25 leading to the encoding matrix 30 and to the storage unit 43. The matrix unit serves to make the leg address selection and the storage unit 42 serves to allocate the output signal from the computer (which has CHK or REJ significance) to its proper storage element leading to the answer-back relays 44, the latter being individual to each leg of a selected leg group.

The + pulse output from the cathode follower V–1A is also utilized to condition tubes V–2 and V–4 in the next succeeding designated stage. The conditioning circuit may be traced through contact *b* of the currently selected stage relay 31 to contact *a* of next succeeding selected stage. Any intervening stage relays 31 that have not been designated by keyset control will have their contacts *a* opened, but will pass the conditioning pulse through contact *b*, then closed against its back contact. Thus, only the designated stages of the ring will be actuated in succession.

Each time that a stepping pulse is received on circuit 623 it will cause triggering of the flip-flop circuit in the next designated stage, and will also cause a re-setting of the flip-flop circuit just previously triggered. Pentode tube V–4 is used for this purpose. The start pulse on circuit 630 persists only until the end of the first revolution. Immediately thereafter, tube V–2 becomes completely blocked and its screen grid potential resumes its normally high + potential. This drives the first grid in tube V–4 conductive and enables this tube to respond to the next stepping pulse. The function of tube V–4 at this time is to block tube V–1B as a re-setting operation for the flip-flop circuit. So each stage is restored to normal after delivering its + pulse for two drum revolutions to its individual output conductor 25.

When the last stage of the address selector is reached, relay 31$_8$ having been energized, not only is the digit "1" signalled from the cathode follower V–1C through conductor 25 to the encoding matrix 30, but at the same time positive output potential is delivered through from contact and associated contact *b* of relay 31$_8$ to the stop signal circuit 632 for purposes heretofore described in connection with the programming unit 34.

Now, let it be assumed that a sale or a cancellation order is to be executed involving only legs 1 and 8 of the ring while legs 2 to 7 inclusive are to be skipped. In this case, failure to operate relays 31$_2$ to 31$_7$ inclusive leaves the stages for legs 2 to 7 undisturbed by the stepping pulses. In place of the transfer of the selecting pulse from cathode follower V–1A through from contact and associated movable contact *b* of relay $31_1$ to the second stage after the first stepping pulse has been applied, the cathode follower pulse from V–2A goes directly through contact *a* of the first, and in this case, the last stage to be reached. Here it is assumed that relays $31_1$ and $31_8$ are the only ones operated. In the illustrated example, this is the last stage of relay 318. Therefore pentode tube V–2A in the last stage is the one which responds to the second stepping pulse.

From the above it will be seen that any desired pattern of leg designations may be defined by the successive steps of the leg ring according to the selection of stages as made by their respective relays 31. Each non-operated relay 31 causes its associated stage to be skipped in the leg ring stepping process. This considerably shortens the time necessary to execute sales and cancellation orders.

THE MATRICES—DECODING AND ENCODING

Figure 3:
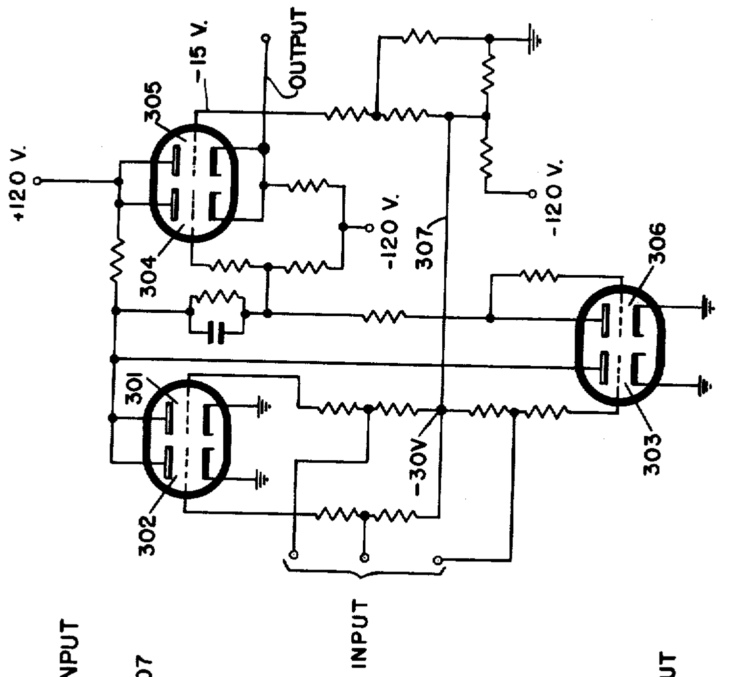
FIG. 3 is a circuit diagram showing a preferred form of electronic matrix as used in certain portions of our system.

FIG. 3 shows details of a typical decoding matrix such as is used in blocks 615, 616, 617, and 618 in FIG. 6. With slight modifications and circuit changes it becomes an encoding matrix such as is included in the component 30 and serves to translate individual circuit selections into different code patterns.

Assuming that the circuit arrangement of FIG. 3 is required to deliver a + output potential whenever all three of its input terminals simultaneously receive negative pulses, these pulses will then render the three triodes 301, 302 and 303 non-conductive. Their anodes are interconnected and are coupled to the input circuit of triode 304, this being a cathode follower tube. Triode 305 has its cathode connected to the cathode of triode 304 and is arranged by its well-known circuit connections to place a negative limit, say 15 volts minus with respect to ground, on the output signal terminal. Triode 306 has its grid connected to its anode and is, therefore, functionally a diode. Its cathode is grounded and its anode is coupled to the input circuit of triode 304. Triode 306 serves to prevent excessive + potential being applied to the grid of the cathode follower. Each of the input terminals is resistively connected to a bus 307 on which a potential of, say, −30 volts is maintained by means of a voltage divider connected between a −120 volts source terminal and ground.

The matrix as described in the preceding paragraph is used by us for timing the delivery of + pulses in successive revolutions of the drum, as explained in the foregoing description of the Program unit 34. Each matrix of the group 615–618 has three input terminals, two of which derive their controls either from the two counters 610 and 611, the two inverters 612 and 613, or one counter and one inverter; the pattern of connections being different for each matrix. The third input terminal of each matrix receives a constant negative potential from the inverter 614 during the entire period of execution of an order. So the output of + pulses from each matrix is limited to times when all three of its input terminals are negative. Because of the different patterns of input circuit connections each matrix functions at a different time, and for the purposes hereinbefore described.

Considering now the encoding matrix 30 (FIG. 1), this component includes three basic matrix tube assemblies, each assembly comprising four cathode follower triodes, the cathodes of which are interconnected by a conductor which yields a + output potential whenever any one of the cathode follower triode grids is driven +. Each cathode follower has its control grid connected to a particular one of the conductors 25 coming from the leg ring unit 32. It will be recalled that + pulses are transmitted singly and in succession at times governed by the stepping of the ring. The encoding matrix 30 is arranged to establish a different 3-element code in response to each of the pulses as delivered through a different conductor 25.

The encoding operation may be readily understood by reference to the following tabulation and the description relating thereto:

| Position of Leg Ring | Digit out from Cathode Follower Assemblies | | |
|---|---|---|---|
| | $2^2$ | $2^1$ | $2^0$ |
| Reset | 0 | 0 | 0 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |
| 7 | 1 | 1 | 1 |
| 8 | 0 | 0 | 0 |

From positions 1, 2 and 4 of the leg ring the conductors are each connected to an individual grid of a different one of the cathode follower triodes, each such triode being one of a different assembly. From positions 3, 5 and 6 of the leg ring each conductor 25 controls two cathode followers, these being of the assemblies where the digit out is "1" for these leg ring positions. Position 7 is represented by a conductor 25 which is connected to grids of three different cathode follower triodes each in a different assembly. Conductor 25 from the #8 position of the leg ring is carried to the grid of a triode in a fourth matrix assembly which is of the type shown in FIG. 3, but has a fourth triode with its anode connected in parallel with those of triodes 301, 302 and 303.

Now picture this fourth matrix as having its triodes 301, 302, and 303 subject to control by output potentials from the three cathode follower assemblies respectively. Also the fourth triode in this fourth matrix is directly controlled by the signal coming through conductor 25 from the #8 position of the leg ring. This matrix, then serves to translate a pulse representing the #8 position into a code combination representing the binary number 1000 and in distinction from binary number 000. The comparator unit 23 must make this distinction because the counting pulses registered in the synchronous pulse counter 24 start with 001 and end with 000 subsequent to 111. On the other hand, the reset condition of the leg ring 32 is one in which there is no + potential applied to any of its output conductors 25. The cathode follower assemblies of the matrix 30, considering their integrated output, deliver on their three output circuits negative signal potentials which match the code pattern for 000 at the time when the counter 24 has reached its #8 count. These negative pulses are also carried to three of the triodes in the fourth matrix, the fourth triode being driven conductive by the + pulse on conductor $25_8$ (during leg selecting position #8). Hence the interconnected anodes of the four triodes will be held at low potential for the eight leg address selection. During each of the other leg address selections at least one of the cathode follower assemblies will have a ++ output potential that will be applied to a grid or grids of tubes 301, 302 and 303, and so will be effective in holding the interconnected anodes of these triodes at low potential. These triodes and the fourth triode above mentioned have their anodes coupled to the grid of an inverter tube the anode of which is connected through a conductor 60 to a common line 61 which carries sampling pulses from comparators 18 and 23 to the joint control lock 33 (FIGS. 1 and 2). Line 61 must be held positive in order to release the lock 33. The comparators 18 and 23 and the fourth matrix assembly in component 30 are cooperative in carrying out this requirement. During the reset interval of the leg ring, however, all four of the triodes of the fourth matrix will be held non-conductive, and, hence, the inverter tube which is controlled thereby will deliver a low output potential on conductor 60 and will prevent the release of lock 33 at a time when no address sampling is wanted.

The composition of different code patterns by the three basic cathode follower assemblies of the encoding matrix 30 will be well understood by those familiar with conventional matrix techniques. The three conductors 29 (FIG. 1) leading to the comparator 23 carry the encoded pattern of + and − potentials to comparator circuits of well known type. These same circuits are also fed with the changing patterns of the binary digit counts supplied by the counter 24, as previously described. When the two patterns become matched conductor 61 delivers the needed + signal for releasing the lock 33.

THE COMPUTER 42

This computer is of a type which handles binary numbers under control of static pulses. All of the digits of a binary number are represented by circuit arrangements, one digit order of which is illustratively shown in FIG. 8.

This computer is adapted to add two binary numbers and also to subtract by adding the complement of the subtrahend. A subtractive operation is, therefore, equivalent to addition.

In order to show how the computer component 42 (FIG. 2) fits into the general scheme of the entire reservations system, we have indicated input conductors B (FIGS. 7 and 8) as going into each of seven different digital stage units of the computer 42 and carrying from the seven gated registers 40 a signal representing the value 0 or 1 with respect to each denominational order of a seven digit binary number as read out from any section of the leg inventories. It will be recalled that the read-out operation is simultaneous for all seven digits and the read-out of a particular inventory item is determined by the functioning of the comparator 39, which responds to the selection by the leg address of any particular leg inventory. Thus, the leg inventory balance becomes stored in the unit 40 and each digital order of the binary number representing that balance is fed with either a ground potential pulse representing the digit 1 or a negative pulse representing the digit 0. These pulses are all applied to terminals B in the different stages of the computer, one stage of which is shown in FIG. 8.

From the keyset, signals are transmitted through cable 8 and individually on seven different wires 53 representing the binary number value of a demand for seats. When an availability order is to be filled, the seat demand represents a number to be subtracted from the inventory balance. The different digit components of the computer are each fed with one or the other of the two input potentials (ground or −30 volts) by which the digits of the seat demand number are represented. These potentials are applied at terminals D.

Figure 7:
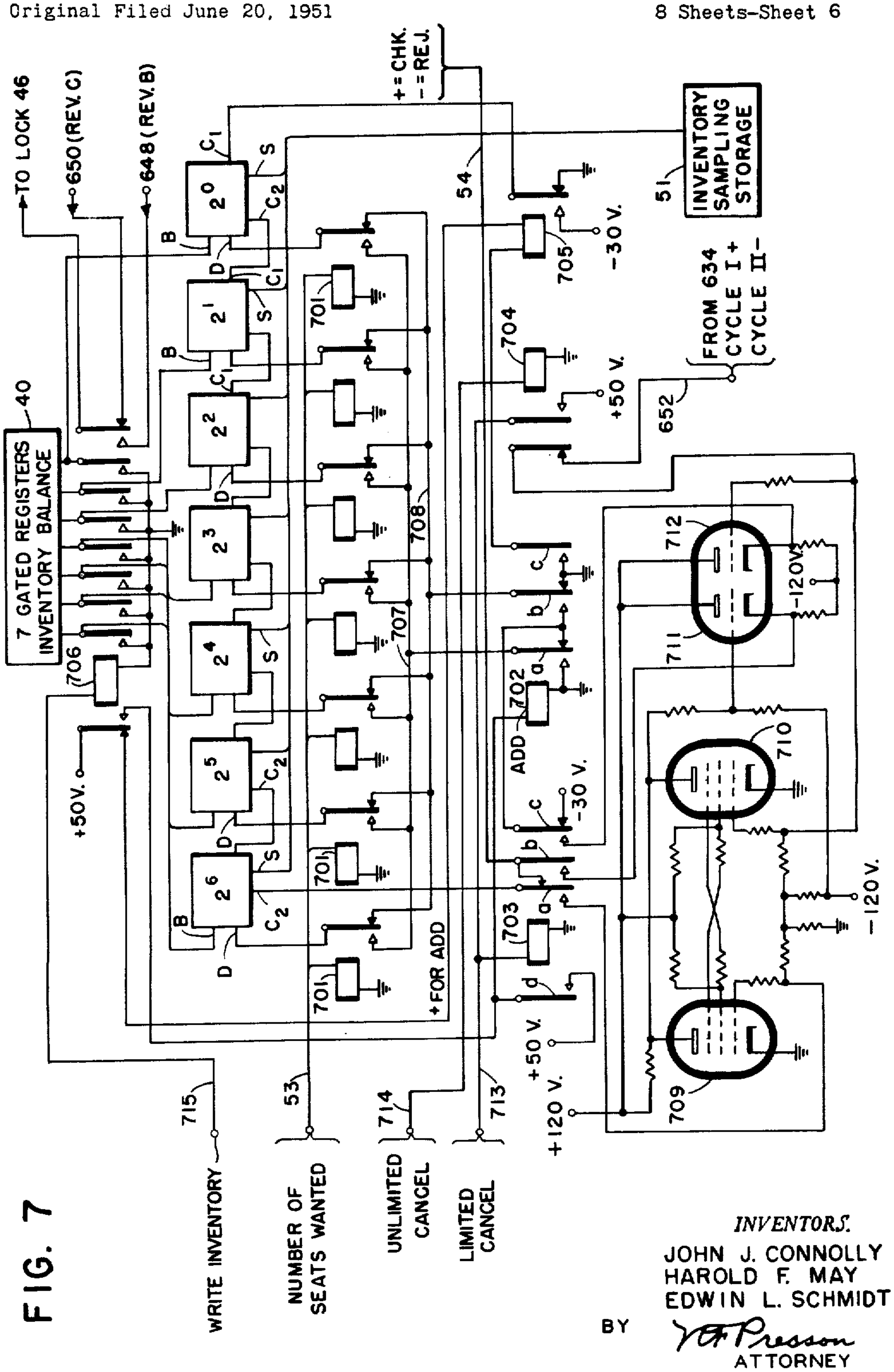
FIG. 7 is a circuit diagram showing relay controls for executing different types of orders.

Each digital order component of the computer is also provided with a "carry in" terminal $C_1$. As shown in FIG. 7, the digital orders are interconnected from stage to stage by means of these carry input circuits. Even the lowest order $2^0$ is also provided with a so-called "end-around-carry" circuit $C_1$ the control of which is unconventional, as will presently be explained. There is also a carry-out circuit $C_2$ and a digitout circuit S for each of the denominational order sections of the computer.

The detailed explanation of the electronic circuit, as shown in FIG. 8, will now be given, and will be followed by an explanation of the use of the entire computer in carrying out different types of orders.

The components of one stage include six pentode tubes, U, V, W, Y, and Z. Two twin triode tubes E and F are also used. The usual positive and negative voltage supplies, together with an intermediate ground connection, are shown and are so familiar to those skilled in the art that their connections with various resistors of the input and output circuits would seem to require no further explanation. The pair of tubes U and V is so interconnected that variations of screen grid potential of one tube will affect the bias on the suppressor grid of the other. The same is true of the pair of tubes W and X.

The pentode tube Y has its first grid subject to control by variations of suppressor grid potential in the tube U which, in turn, is subject to control by the screen grid in tube V. Furthermore, the bias on the suppressor grid of tube Y is held the same as that in tube V, which results from variations in screen grid potential in tube U.

In a similar manner, tube Z is made subject to control by variations of screen grid potentials in tubes W and X respectively.

The right hand section of tube E is a cathode follower triode, the output circuit from which supplies static potentials for the duration of a signalling interval representing the carry-out pulse $C_2$. The left hand triode section of tube E is connected effectively as a diode and its function is merely to limit the + range of grid bias potential applied to the right hand section of the same tube E.

Tube F is similarly constituted with respect to tube E. Its right hand section is a cathode follower which delivers an output potential S representing the sum $B+D+C_1$ as a unit's order digit irrespective of a carry to higher order.

There are eight permutations of potentials (input digit signals) as applied to terminals B, D and $C_1$ simultaneously. The following table indicates the responses in the several tubes and at junction point A for each of the eight permutations. Ground potential applied to an input terminal or delivered by the cathode of a tube such as E or F represents binary numeral "1." A negative potential of, say, −30 volts represents "0." Screen grid (SG) and anode potentials are indicated as Low (L) or High (H) according to conductance or cut-off conditions of the pentode tubes, and the effects of these variations are obvious to those skilled in the art.

| Input Signals | | | Tube U | | Tube V | | Point A | Tube W | | Tube X | | Anodes | | Cathodes | |
|---|---|---|---|---|---|---|---|---|---|---|---|---|---|---|---|
| B | D | $C_1$ | SG | Anode | SG | Anode | | SG | An. | SG | An. | Y | Z | E $C_2$ | F S |
| 0 | 0 | 0 | H | H | H | H | H | L | L | H | * | L | * | 0 | 0 |
| 0 | 0 | 1 | H | H | H | H | H | L | H | L | H | L | * | 0 | 1 |
| 0 | 1 | 0 | H | * | L | L' | L | H | H | H | H | * | L | 0 | 1 |
| 0 | 1 | 1 | H | * | L | L | L | H | * | L | L | H | H | 1 | 0 |
| 1 | 0 | 0 | L | L | H | * | L | H | H | H | H | * | L | 0 | 1 |
| 1 | 0 | 1 | L | L | H | * | L | H | * | L | L | H | H | 1 | 0 |
| 1 | 1 | 0 | L | H | L | H | H | L | L | H | * | H | H | 1 | 0 |
| 1 | 1 | 1 | L | H | L | H | H | L | H | L | H | H | H | 1 | 1 |

*Means that the tube is non-conductive but the anode potential is low on account of the conductive state in the other tube of the pair.

To recapitulate what is shown in the foregoing table, the signal (1) is delivered as a sum (S) whenever there is an odd number of 1's applied as input signals. The sum (S) is (0) when the number of input 1's is even. The carry-out signal $C_2$ is (1) whenever the number of input 1's is two or three, and is (0) otherwise. Thus a well-known requirement for any stage of a binary adder is satisfied.

EQUIPMENT FOR ENABLING THE COMPUTER TO EXECUTE DIFFERENT ORDERS

The computer 42 is required to operate in different ways according to the instructions given to it for the execution of different orders. Among the different types of orders enumerated in the early part of the specification there are six, two of which can be executed under a normal setting of the circuit arrangements of the computer, and four others which require circuit modifications for which relay controls are provided. FIG. 7 shows essential details of the equipment for operating the computer according to the requirements that are imposed from time to time.

The seven digital order stages, a typical stage being as described in the preceding chapter, are labeled as binary digits $2^0, 2^1 \ldots 2^6$. Each stage has three input terminals B, D and $C_1$, and two output terminals S and $C_2$; like terminals as shown in FIGS. 7 and 8 having the same reference characters.

Component 40, labeled "7 GATED REGISTERS, INVENTORY BALANCE" has already been described as a storage unit for receiving a read-out of any selected inventory balance item. The binary number representing this balance is communicated to terminals B of the computer stages as soon as the read-out occurs. If an availability order or a sale order is to be executed, the number of seats wanted is delivered to terminals D, of the computer stages, but indirectly according to the selection of relays 701 by signals from the keyset, as transmitted through wires 53 in cable 8.

Relay 702 when operated causes the computer to add, whereas normally the computer is set to subtract. The availability and sale orders are those most frequently executed, and this accounts for the normal setting so as to subtract seats wanted from an existing inventory balance. Addition is necessary, of course, when entering cancellations. An order for read-out of the exact inventory balance can be originated only from the master keyset 3, or from one of the control sets 2, it will be remembered. Such an order, however, is executed by the computer in the same manner as an availability request, except that the set-up of seats wanted is binary number 0000000, and the true inventory balance is reported to an inventory sampling storage unit 51 and sent back to the inquiring station 2 or 3 in response to a sampling control signal on conductor 647 at the end of the second revolution of the drum (FIGS. 1 and 2).

A limited cancel order, as previously explained, must be rejected if the inventory balance is zero, but otherwise it will be executed when relay 703 is operated. Relay 704 responds to an unlimited cancel order. Relay 706 is operated in response to an order involving the write-up of a new inventory balance. Relay 705 controls the substitution of (0) for (1) as the carry-in signal $C_1$ to stage $2^0$ for cancel orders only.

Other equipment shown in FIG. 7 includes two pentode tubes 709 and 710 and two cathode follower triodes 711 and 712. The functions of these tubes will be explained in connection with the details of order execution when different instructions-giving relays are operated.

*Availability and Sale Orders*

For execution of either of these orders the computer stands normally set to subtract the number of seats wanted from the current inventory balance. Relay 702 has transfer contacts *a* and *b* and a make contact *c*. This relay is not energized for subtraction, nor is relay 703, which has four movable contacts *a*, *b*, *c*, and *d*. A potential of −30 volts is supplied to back contact engaged with contact 703*c* and is passed through contact 702*a* to a bus 707 feeding front contacts of all relays 701. Bus 708 feeds the back contacts of all relays 701 and is normally grounded through contact 702*b*. These bus potentials are such as to invert the binary number set up on relays 701, so that the complement of that number is applied to terminals D of the computer stages. That means, for example, if two seats are wanted, the number 0000010 (because it is a subtrahend) becomes 1111101 when entered into terminals D of the computer stages. In effect, the computer always operates as an adder. Unoperated relay 705 has a back contact which is grounded for the purpose of introducing signal representing (1) into the lowest order stage $2^0$ on its terminal $C_1$.

The following example shows how the computer operates when directed to execute an availability request order or a sale order:

| | Decimal Notation | Binary Digits |
|---|---|---|
| Inventory read-out | 5 | 0000101 |
| Seats wanted | 2 | 1111101 (complement) |
| $C_1$ Input carry | | 1 |
| Chk. signal and Bal. | 3 | 1)0000011 |

The CHK signal is a + potential coming out from terminal $C_2$ of stage $2^6$. It is carried through contact *a* and its back contact of relay 703 and is transmitted through conductor 54 to the distributive electronic storage unit 43 containing eight flip-flop pairs, each corresponding to one of the eight legs of a selected group. At the end of each second revolution of the drum, Cycle I, the CHK signal is gated out to an appropriate answer relay of component 44 where it is relayed over one of eight conductors in cable 8 back to the agent's set which originated the order.

If the order called for more seats than were available, the REJ signal would result from computer operation thus:

| | | |
|---|---|---|
| Inventory read-out | 1 | 0000001 |
| Seats wanted | 2 | 1111101 (complement) |
| End-around carry | | 1 |
| Rej. signal (0) | neg. | 0)1111111 |

In this case the negative potential at terminal $C_2$ of stage $2^6$ goes out through the same channels as the CHK signal. If, however, relay 627 is operated as for attempting to execute a sale order, the REJ signal when stored in unit 43 in respect to any leg inventory that comes within the scope of the order has the effect of sending a stop signal into the programming unit. The stop signal is then transmitted through conductor 56 and contact *b* of relay 627 (FIG. 6) and thence to gate 640, which prevents the processing of Cycle II, as previously explained.

The stop signal as described in the preceding paragraph does not reach gate 640 if the order is only an Availability inquiry, because in that case a full report is wanted at the keyset respecting each of the eight legs of a selected group, and Cycle I must be carried out until either the CHK or REJ signal is obtained with respect to each of the eight legs. Relay 627 is not operated in this case, but only for a sale or cancellation order involving Cycle II. During Cycle I when relay 627 is operated, then at the end of a second drum revolution respecting any leg which has an inadequate inventory balance, the REJ signal arrests further functioning of the programming unit and prevents the release of lock 46 so that it becomes impossible to record the negative balance which resulted from over-subtraction. The programming stops before Cycle II is reached.

*Limited Cancel Orders*

The computer is capable of distinguishing between a balance of zero and a balance greater than zero for determining if a cancel order should be rejected or carried out. The maintenance of a waiting list, when all seats for a given leg of a flight have been sold, has already been explained; but the function of the computer in this connection is to utilize the CHK—REJ signal emanating from terminal $C_2$ of stage $2^6$ so as to allow the cancellation order to be executed if there is a current inventory balance greater than zero, and otherwise to prevent that execution by giving out the REJ signal. The computer operates in the following manner—the operating conditions being differently established during Cycle I from those which follow in Cycle II:

The binary number representing seats to be cancelled is set up by selective actuation of relays 701 in response to keyset control, the same as when the agent calls for a given number of seats wanted. The keyset has a lever key which is set to a position for closing a circuit through conductor 713 to supply it with a + operating potential. This circuit closure operates relay 703. Its contact *d* supplies an operating potential to the winding of relay 702 and operates same. Relay 702 has a contact *c* which grounds an operating circuit for relay 705, the operating potential being supplied through a back contact and contact *a* on relay 706.

This setting of the three relays 703, 702 and 705 enables the selected inventory balance to be tested for a zero read-out or an above-zero read-out during Cycle I, and, in the latter case, to enter the cancellation by recording the new inventory balance, giving effect to the added item.

For making the test during Cycle I the registration on relays 701 of the number of seats to be cancelled is overridden by supplying + potential to both buses 707 and 708. Bus 707 is thus grounded through contact *a* of relay 702. Bus 708 is connected through contact *b* of relay 702 and contact *c* of relay 703 to the cathode of cathode follower triode 712, this triode being rendered conductive during Cycle I by a positive static potential on conductor 652 which is the output circuit of inverter 634. Consequently the binary number 1 is registered at terminal D of each of the computer stages, while the read-out of the inventory is registered at terminals B, according to the current balance.

These examples show that the carry-out signal $C_2$ from stage is + if the inventory balance is above zero, and minus if zero:

| | Binary No. | Binary No. |
|---|---|---|
| Read-out of inventory | 5=0000101 | 0=0000000 |
| Terminals D all + | 1111111 | 1111111 |
| Neg. $C_1$ into stage $2^0$ | 0 | 0 |
| $C_2$ from stage $2^0$ (1=CHK) $\underbrace{1}_{C_2}$ | $\underbrace{1)}_{C_2}\underbrace{0000100}_{S}$ | $\underbrace{0)}_{C_2}\underbrace{1111111}_{S}$ $(\underbrace{0}_{C_2}$=REJ) |

The output signals on terminals S are meaningless and are not used until Cycle II is performed as follows, assuming, for example, that the number of seats to be cancelled is 2:

| | |
|---|---|
| Read-out of inventory | 5+0000101 |
| Cancellation (relays 701) | 0000010 |
| Neg. $C_1$ into stage $2^0$ | 0 |
| $C_2$ from stage $2^6$ | 0) Can be inverted |
| New balance to be posted | 0000111 (=7) |

The relays 703, 702 and 705 remain operated throughout the execution of this order, and hence, during Cycle II we rely upon the control of the cathode follower triode 712 to remove the + potential from bus 708 and give it a negative potential which is normal for additional. During Cycle II the grid of triode 712 receives a negative potential from inverter 634 through conductor 652, so that the cathode of this tube has a potential of, say −30 volts. Binary stages which should be fed with this minus potential on their input terminals D to register digits "0" will obtain this effect from the cathode of triode 712 if the associated relay 701 has not been operated from the agent's keyset. The remaining stages will receive ground potential representing "1" since their terminals D are connected through front contacts of operated relays 701 to bus 707, the latter being grounded through contact *a* and its associated front contact on relay 702. Accordingly the additive operation of the computer will be correctly performed during Cycle II, provided the old inventory balance was greater than zero.

In this example given above, where the sum 5+2=7 is correctly computed, it will be noted that the output signal from terminal $C_2$ of stage $2^6$ is "0," which is ordinarily given the meaning REJect, or STOP. In the present embodiment of our invention we do not have occasion to consider this signal as in need of inversion because we simply provide means for opening circuit 54 so that it will have no effect during Cycle II.

In case, however, that we might find need to use the CHK—REJ signal during Cycle II, this signal may easily be inverted, using an inverter tube and a cathode follower (not shown) in combination with certain transfer contacts on one of the relays, all of which would amount to an obvious substitution with respect to the circuit arrangement including tubes 709, 710 and 711 as shown in FIG. 7. In fact this showing has greater flexibility of operation than the simple inverter tube scheme suggested above, in that it meets the requirements during Cycle I for execution of both limited and unlimited cancel orders and does not require opening the circuit connections over conductor 54 to the answer-back and stop control means at any time. It is sufficient for this disclosure, therefore, to describe and explain the circuit arrangement as shown in FIG. 7, since it is capable of inverting the $C_2$ signal delivered by stage $2^6$ whenever necessary; these cases being for limited cancel orders during Cycle II and unlimited cancel orders at any time.

Relay 703 is directly operated for a limited cancel order by a control signal from the keyset through conductor 713 as above described. It is also operated as a slave to relay 704, when the latter is selected for operation from the keyset, circuit 714 being then closed through the winding of relay 704. Note that contact *a* on relay 704 supplies operating potential to relay 703 when relay 704 is operated.

With relay 703 operated the $C_2$ signal from stage $2^6$ is delivered to the first grid of pentode tube 709. During Cycle I a + potential is supplied by inverter 634 to the first grid of pentode tube 710 which, however, becomes negative during Cycle II. For limited cancel orders and according to the examples given above it was shown that the CHK—REJ signal requires no inversion during Cycle I. The check signal being + to indicate a positive inventory balance in the read-out of the inventory, this signal renders tube 709 conductive as far as its screen grid. Tube 710 is also conductive during Cycle I, but only as far as its screen grid. The cross-connections between the screen grids and the suppressor grids of tubes 709 and 710 are such that the electron streams in these tubes do not reach the anodes when both screen grids are at low potential. The anodes have a common output through a voltage divider between + and − terminals of the operating source. A junction point on this divider is connected to the grid of the cathode follower triode 711. In this case the CHK signal is properly regenerated by the positive potential of the cathode in triode 711. It is delivered through closed contact *b* of relay 703 to the outgoing conductor 54.

In case the REJ signal (0) were to be delivered from terminal $C_2$ to the first grid in tube 709, its negative potential would completely block tube 709, raising its screen grid potential so that tube 710, having its first grid positively biased from inverter 634 (Cycle I only) would then become conductive through to the anode. The anode potential being then lowered would more negatively bias the grid in triode 711 and cause the cathode of this cathode follower to regenerate the necessary negative pulse for delivery of the REJ signal through contact *b* of relay 703 to output conductor 54 as is required when the limited cancel order is not to be carried out.

*Unlimited Cancel Orders*

"Instruction" coming from the Master Keyset 3 is in the form of an operating potential applied through conductor 714 to relay 704. This relay when operated closes an operating circuit through its contact *a* which makes a slave of relay 703. As explained above, relay 703 operates relay 702 and then relay 702 operates relay 705. This combination of relay operations is one that meets the requirements for entering a cancellation without limit. The conditions and mode of operation are explained as follows:

Circuit 652 from the inverter 634 in the programming unit is opened so that no change will take place in the operating conditions when passing from Cycle I to Cycle II. Triode 712 cathode is held negative by the fixed negative bias on its grid. So a negative cathode potential is applied by triode 712 to bus 708, the connection thereto being one which traverses relay contacts 703*c* and 702*b*. Bus 707 is grounded. Triodes 709 and 710 operate to invert the signal $C_2$, as previously explained. Since relay 705 is operated the carry-in signal to stage $2^0$ is $-30$ volts, which is of "0" significance.

An unlimited cancel order execution is one that does not involve testing the inventory to determine if it has a zero balance. In the first two revolutions of the drum, and in Cycle I there is no useful effect because the procedure is repeated in Cycle II. The only reason for this is that, for the sake of standardization of the programming equipment and simplification thereof, no provision has been made thus far in the embodiment of our invention for executing Cycle II without first executing Cycle I. The loss of time is restricted to the execution of unlimited cancel orders and these are relatively infrequent.

The read-out of a current inventory balance becomes stored in the 7 gated registers 40 and is applied to computer stage terminals B, the same as when executing orders that have been described above. The number to be added back into the inventory is registered on relays 701, the "1" digits being applied to terminals D as positive potentials from bus 707, while "0" digits will be represented by negative potentials derived from bus 708 and back contacts of relays 701 that are not operated. The correctness of the additive process in this case is illustrated by the example last given in the chapter on Limited Cancel Orders. The CHK is a "0" as given out at terminal $C_2$ of stage $2^6$, but is inverted by the circuit of tubes 709 and 710 in control of the cathode follower 711 as follows:

Remembering that the first grid of pentode 710 is held negative (contact 704*b* being open circuited) the screen grid of tube 710 gives a + potential to the suppressor grid in tube 709. Tube 709, therefore, is enabled to act as an inverter. When its first grid is negative the anode is at high potential and drives the cathode follower triode 711 conductive. If tube 709 were to be made conductive by a + potential output from terminal $C_2$ of stage $2^6$ an error amounting to computing a sum in excess of the capacity of the 7-stage computer would be indicated. This is an unlikely possibility, and one that could result from improper manipulation of the keyset. In this case the grid of triode 711 would be driven negative and hence this triode, by its negative cathode, would generate the appropriate REJ signal="0" for delivery over conductor 54. Thus it will be seen that in all cases of handling cancel orders the CHK—REJ signal is reversed except during Cycle I of the Limited Cancel order procedure.

*Read-Out of Inventory Balance*

As explained in an earlier part of this specification, the read-out order is given only from one of the keysets 2 or 3 where indicator lamp means are provided for showing the inventory balance as a binary number. Each of the output terminals S of the computer is connected to a separate storage element in the inventory sampling unit 51 whence signals may be transmitted through seven conductors 52 to indicator lamps in the keyset that makes the inquiry. In the keyset none of the keys for seats wanted will be fingered, and hence the read-out order can be handled the same as an inquiry order. So none of the relays shown in FIG. 7 will be actuated. The computer and related equipment is in normal condition to subtract zero from the read-out of the inventory, the latter being registered at input terminals B of each binary stage. Since none of the relays 701 are actuated terminals D receive + potentials (=1) as the complement of "0", the computer being set for subtraction. Also, ground potential (=1) is supplied to terminal $C_1$ of stage $2^0$, the same as for other subtracting operations. The setup in the computer then may be exemplified as follows, assuming that the inventory balance is found to be 13:

| | |
|---|---|
| Read-out of binary number | 0001101 |
| Complement of no seats | 1111111 |
| End-around carry | 1 |
| CHK signal and bal | 1)0001101 |

It will be apparent that this is the desired result, and that the inventory sampling storage unit 51 will receive the proper signals from terminals S of the several computer stages.

*Write-Up of a New Inventory Balance*

The order originates only at the Master Agent's keyset on which a key is provided for transmitting the "instruction" represented by an operating potential applied through conductor 715 to the winding of relay 706. This relay by pulling up its transfer contact *a* makes a slave of relay 702 and opens the operating circuit of relay 706 so that relay 702 will have no control over the latter.

Relay 706 has seven make contacts *b* which engage with grounded front contacts. Thus, although a read-out of the old inventory balance is injected into the gated register component 40, this read-out is over-ridden by the + potentials (ground) of closed contacts *b* on relay 706. All input terminals B, therefore, receive the digit-in signal "1." The carry-in signal $C_1$ to the digit stage $2^0$ is ground potential (=1), since relay 705 is not operated. Relays 703 and 704 do not operate, since they have no useful function. The CHK—REJ signal does not need to be transposed. As an example of execution of this type of order let the old inventory balance be 3=binary 0000011, and let the new balance be 22=16+4+2=binary 0010110, then:

| | |
|---|---|
| Digit B: "1" replaces "0" in old balance | 1111111 |
| Digit D: new balance | 0010110 |
| C: end-around carry | 1 |
| CHK=C=(+) and write-up of new bal | 1)0010110 |

Relay 706 has a set of transfer contacts *c* the movable contact of which is connected to lock 46. The back contact is connected through conductor 650 to the output terminal of matrix 617 and when relay 706 is not operated this circuit releases the lock 46 during the third revolution of Cycle II for the purpose of transmitting record-pulses to the recording heads in a manner normal for sales and cancel orders. When relay 706 is operated, however, for the write-up of a new inventory, the lock 46 receives its releasing potential through front contact mating with contact *c* of relay 706, the connection then being such as to release the lock during the second revolution of Cycle I. This connection thus puts the lock under control of a static pulse through conductor 648, which is the output circuit of matrix 616 during the second revolution of Cycle I. The precise instant for recording the new item in its proper place is the same as that for a selected read-out as determined by the functioning of the comparator 39. The read-out pulses are smothered by the record pulses of far higher amplitude. Thus, we have found it unncessary to delay the write-up of a new inventory until Cycle II is processed, particularly as the read-out of the old inventory balance is worthless at the time of executing this type of order.

THE STOP CIRCUITS AND THEIR ORIGINS

At various points in this specification reference has been made to the use of stop signals for terminating the processes of our system when it is found that an order can not be excuted. By way of recapitulation of this subject the stop circuits, their origins and their functions will now be considered.

Stop signals are also used to terminate the programming even when the order is found possible to execute and is allowed to go through to completion.

All stop signals are directed into the mixer 637 at one time or another. The output from the mixer is a positive dynamic pulse which triggers the set-reset flip-flop circuit 608 and causes the same to be restored to that stable state which we call the "turned-off condition." In that state it is again made responsive to a "turn-on" pulse from the other set-reset flip-flop circuit 607 after the latter receives a new start signal. Although the drum continues to rotate between successive periods of order assignments all gates and other equipment are made idle during "off" periods.

(1) When Availability Inquiry orders and Inventory Read-Out or Inventory Write-Up orders go through to completion the dynamic pulse output from gate 624 comes at the end of Cycle I and is delayed by the delay multivibrator unit 625 the output from which goes through contact *a* of unoperated relay 627 directly to the mixer 637. Gate 624 in this case is conditioned by a static pulse from the last designated leg ring stage (component 32) to be reached in the selected group of leg addresses to be searched. Then the pulse output from gate 624 is timed by the "either gate" 620 to occur at the end of the second revolution of Cycle I. Orders calling for the read-out or the write-up of inventory addresses are stopped in the same manner after going through to completion, the stop signal being delivered at the end of the second revolution in Cycle I if it relates to the last designated leg of the selected group.

(2) At the completion of any order which involves the processing of Cycle II the stop signal is carried from gate 624 through the delay multivibrator 625, as before. In this case the output from component 625 is responded to by gate 636 which is conditioned to pass the stop signal along only during the processing of Cycle II, as a result of the output potential from component 628 being made + only for Cycle II. The timing of the stop pulse is fixed by the action of the gate 620 to occur at the end of the third revolution of Cycle II which relates to the last designated leg of the selected group.

(3) There is a matrix (not shown) which may be assumed to be combined with one of the components 43 or 44 (FIGS. 1 and 2) and is effective to integrate the serially delivered CHK—REJ signals coming out of the computer on conductor 54. The information so derived is transmitted as a stop signal on conductor 56 to contact *b* of relay 627 (FIG. 6), but only if, during Cycle I, an insufficient inventory balance is found by the computer respecting some leg which is involved in a sale order or a limited cancel order. The stop signal then prevents the continuance of the processing into Cycle II, since relay 627 is held operated from the start of Cycle I and carries the stop singal to gate 640. The output circuit from gate 640 delivers a reject pulse on conductor 641 leading back to the cable 8 and through the latter to the calling station. The gate 640 also delivers the stop signal to mixer 637 and at a time determined by the delayed "gap reset pulse" which issues from the delay multivibrator 601 and which opens gate 604 to deliver a dynamic control pulse. Thus the equipment may be turned off at the end of any revolution in which conditions are found unfavorable to the completion of an order.

Relay 638 has been shown in FIG. 6 as a means for opening the CHK—REJ circuit between gate 640 and mixer 637 when an unlimited cancel order is to be executed. It will be recalled that in the description of FIG. 7 the processing of an unlimited cancel order did not enable the carry out signal $C_2$ from stage $2^6$ to have the same sense as when other orders were executed, and if the CHK—REJ signal went through conductor 54 without inversion an unwanted stop signal would result. In the absence of means for inverting the $C_2$ signal it would be a function of relay 638 to open the circuit from unit 640 to unit 637 by operating relay 638 as a slave to relay 704. But when the circuit of tubes 709, 710 and 711 is provided relay 638 can be dispensed with.

(4) Conductor 633 is shown in FIGS. 1 and 6 to be a representative lead for stop signals from every source of operational failure, so that these signals may be delivered to the mixer 637 at the instant when erroneous operation is discovered or when the order as given can not be completed. Among the reasons for generating the top signal are the following:

(*a*) The set-up on a keyset of a date which is outside of the coverage of the current inventory period. The date decoder 9 delivers the stop signal in this case. (*b*) We may, if desired, duplicate some of the comparator units and the computer and cause them to operate in parallel. In this case guard circuits will be provided such that upon the occurrence of any disagreement between the operations of two units which have the same functions to perform the guard circuit will at once detect the fact that one of the components has operated erroneously, in which case the error signal will be transmitted through conductor 633, and will be transmited back to the calling station as a REJ signal.

Various of the circuit elements or sections thereof may be wired to provide standard assembly or sub-assembly units, or so-called "building blocks," so that they will be adaptable for ready insertion in the circuit. Some of these may be made up of two identical elements each of which may function separately. For example, and as shown in FIG. 9, a mixer pair may comprise two identical mixers; the input terminals for one-half of the unit are designated at 1 and 2, and for the other half are designated at 5 and 6. The outputs of the two mixers respectively are designated by terminals 3 and 4. Tube elements V1–A and V1–B of the respective mixers may, if desired, be embodied in a twin triode vacuum tube as indicated, and likewise with respect to triode elements V2–A and V2–B. These mixers apply signals received from two separate inputs and apply them to one output, but cause the inputs to be decoupled from one another. By strapping terminal 3 to terminal 4, an output at 3 or 4 will be obtained with an input to terminals 1, 2, 5 and/or 6. At all times the output 3 or 4 is of the cathode follower type.

FIG. 10 illustrates a standard unit for a binary counter. In these units two "counter-2's" are used to count pulses in binary form, and the number of units employed in a counter depends upon the maximum binary number used. For instance, to count to the numerical number 16, four counter-2's would be used; the first counter unit would represent the presence or absence of the binary digit 1; the second unit indicates the presence or absence of binary digit 2; the third unit indicates the presence or absence of the binary digit 4, and so on. Such a unit has two different types of inputs, i.e., a counting input at terminal 6, and a reset input at terminal 4. The two pentodes V2 and V4 in the figure insure that the flip-flop circuit of V3–B and V1–B is conditioned properly for counting. The pentodes perform no resetting operation since there is only one position for the flip-flop to assume when reset by tube V3–A, which is that V1–B is firing. The output at terminal 1 is of the cathode follower type. From an external unit with which the counter is associated, the position of the flip-flop may be set to one side or the other by inputs at terminal 2 or 3.

The set-reset flip-flop units 607, 608 and 628 of FIG. 6 are similar to the counter-2 unit of FIG. 10 except that the pentode V2 is removed from the circuit to change terminal 6 from a counting input to a "set" input. For example, any number of pulses at terminal 6 will set the flip-flop one way only, i.e., with tube V3–B fired, in a set-reset unit of this type. The reset input, terminal 4, is unaffected by the removal of tube V2.

FIG. 11 shows a gate unit having an RC delay circuit leading from terminal 1 to provide a suitable delay for timing purposes; in the particular circuit illustrated herein the delay circuit has a time constant of approximately 10 microseconds. The input terminals are indicated by numerals 1 and 3, and the output by terminal 4. The output of the gate unit also includes a cathode follower.

FIG. 12 illustrates a unit containing two comparator sections V1, V2, and V3, V4, in a comparator. The input terminals for one section are shown at 1 and 2, and for the other section are shown at 5 and 6. The outputs 3 and 4 are connected together externally of the unit and the outputs of two or more such units are connected in parallel. Two of such units form a comparator such as 18 or 23 in FIG. 1, and five such units are embodied in comparator 39 of FIG. 2 which also includes an end unit shown in FIG. 13 referred to below.

FIG. 13 shows the end pair of a unit designated "*a*," associated with a group of comparator units in the comparator 39 of FIG. 2. The input terminals to one-half of the unit are designated at 1 and 2, and to the other half at 5 and 6. The separate outputs of the two halves are terminals 3 and 4 respectively. Terminals 1 and/or 6 are connected to the outputs of the preceding comparator units, and terminals 2 and 5 are separate gating inputs for programming. The outputs 3 and 4 are of the cathode follower types. In the end unit of comparator 39, and as shown in the figure, two identical locks are provided which respectively comprise the suppressor grids of tubes V4 and V2. One of these locks, which in FIG. 2 is indicated by a rectangle 28, is embodied in the terminating unit of the comparator 39, and is utilized in the read-out of leg inventories and is connected to the 7-Gated Registers 40, and the other lock is involved in recording new inventory balances and is diagrammatically designated at 46 in the figure and also is embodied in the terminating unit of the comparator 39.

The joint control lock 33 of FIG. 2 may comprise a unit similar to the comparator of FIG. 13, except that one-half of this unit is sufficient and the potential (or phase) of the output terminal is opposite to that of the output terminal 3 or 4 of the comparator pair "A."

FIG. 14 illustrates a digit register unit which is similar to the various conventional digit registers employed in the inventory address shift register 17 of FIG. 2, but differs slightly therefrom in that its output at terminal 6 opens or closes an electromagnetic relay depending on whether a binary digit is stored in its flip-flop V1–B and V3–B. The inputs are terminals 1 and 2. From an external unit the position of the flip-flop in the digit register may be controlled by terminals 3 and 4. These units are employed in the inventory sampling storage unit 51 of FIG. 2, in which seven of such digit registers are used to control seven relays. The address sampling storage 50 of FIG. 2 employs ten of these digit registers to control ten relays. The 7-Gated Registers 40, FIGS. 2 and 7, are similar but have cathode follower outputs instead of electromagnetic relays.

For the sake of clarity and to simplify the drawings and description herein, those of the circuit elements and devices employed which per se are conventional or well known are in most instances not illustrated herein in detail but instead are shown in their operative circuit relationship diagrammatically by means of rectangles with legends to indicate their nature and functions, since the details of such devices and their method of operation are well known in the art. For example, the principles and construction of flip-flops, counters, switches and gates are well known, as evidenced by reference books such as "High-Speed Computing Devices" published 1950 by McGraw-Hill Book Co. Inc., of New York, Toronto and London, in which Chapter 3 thereof discloses various types of flip-flops and counters, and Chapter 4 is explanatory of switches and gates. Delay multi-vibrators of the self-restoring flip-flop type are well known and in each of these units, such as indicated at 601, 602, 603, 619, 625 and 629 of FIG. 6, the time-constant circuit which is included therein in one that allows the flip-flop to stand in its triggered state for a definite time interval following its reception of a trigger pulse. The multi-vibrator then automatically restores itself to its previous normal setting, and at the time of restoration a dynamic output pulse is delivered having a desired time-delay relation to the input pulse. Similarly, the mechanical and electrical construction, parameters and operating characteristics of the other aforesaid circuit elements and devices comprise prior knowledge in the art.

It is to be understood that the details set forth herein are not to be regarded in a restrictive sense but rather as illustrative of the novel features that characterize the invention, and that various changes and modifications are possible within the scope of the appended claims.

We claim:

1. An information storage system comprising a magnetic storage medium having a plurality of data storage areas for magnetically storing signals respectively representing different items, each of said items representing specific units of inventory, and concerning which a plurality of correlated items are selectable to form different groups of items, which items respectively comprise different words of information, said storage medium having address storage areas for magnetically storing a plurality of address code signals respectively individual to said data storage areas, magnetic recording and reading devices and means for causing relative movement between the storage medium and said devices for scanning said storage areas during successive scanning periods, means for generating trains of timing pulses in synchronism with said scanning movement, a source of incoming messages each including a variable reference code signal for selecting a particular group of correlated ones of said inventory items and other signals representing a quantity which if entered in the corresponding data storage areas would effect a change in the inventory values of the signals stored in said storage areas, means jointly controlled by said reference code signal and said timing pulses for successively locating and reading out from said address storage areas in successive scanning periods and temporarily storing certain of said address code signals as determined by said reference code signal, means controlled jointly by the temporarily stored address code signals thus read out and by said timing pulses for successively locating and reading out from the corresponding item storage areas the signals respectively representing the inventory items that comprise the group relating to the desired items, and means responsive jointly to the inventory items thus read out and said other signals representing a quantity change in the incoming message for computing, correlating and indicating the results of the information represented by said signals.

2. A system according to claim 1, including means for temporarily storing the reference code signal embodied in an incoming message during scanning of the address code storage areas throughout a plurality of successive scanning periods, means for reading out the address code signals respectively during non-consecutive scanning periods and for temporarily storing the address code signals thus read out, means controlled jointly by certain of said timing pulses and the temporarily stored address code signals for locating and reading out from the corresponding data storage areas signals representing a plurality of said inventory items respectively during scanning periods intervening said non-consecutive scanning periods.

3. A running inventory system comprising signal storage equipment having magnetizable pulse storage sections for storing code signals respectively representing the current numerical quantitative values of a number of different items, each of said items representing specific units of inventory, and in which said storage sections are selectable in different combinations to form variable groups of items, which items respectively comprise different words of information, a calling station having means for producing and transmitting messages each including selection code signals for effecting a selection of a predetermined variable combination of a plurality of said inventory items to form a desired group of such items and signals representing a desired quantity of each of the inventory items of said desired group, means associated with said signal storage equipment for temporarily storing said selection code and quantity signals of the incoming message, means including magnetic recording and read-out devices for scanning said pulse storage sections in continuous succession and item selection and read-out circuits controlled by the temporarily stored selection code signals for locating and reading out from said pulse storage sections signals representing the currently stored inventory values of the items of the selected group, means for temporarily storing said inventory signals thus read out, means including a computer jointly controlled by each of the last named signals and the temporarily stored signals representing said desired quantity in the incoming message for determining in succession whether the currently stored inventory values of each of said items of the selected group is at least equal to said desired quantity or is less than said desired quantity, and means controlled in accordance with the results obtained by said computer for indicating at the calling station whether said inventory values of the items of the group either are sufficient or are insufficient to supply the desired quantity specified in the message.

4. A system according to claim 3, including means controlled by said computer as each currently stored inventory value is read out for producing a stop signal as soon as the currently stored inventory value of an item of the predetermined group is found insufficient to supply the said desired quantity in the incoming message, and means responsive to said last named signal to stop selection and read-out in regard to the remaining items of the selected group.

5. A running inventory system comprising signal storage equipment having signal bit storage sections for storing data code signals respectively representing the current numerical quantitative values of a number of different inventory items, each of said items representing specific units of inventory, and in which said data storage sections are selectable in different combinations to form variable groups of items which respectively comprise different words of information, said storage equipment having a plurality of other signal bit storage sections for storing different predetermined groups of address signals respectively for locating the data storage sections of said words in different variable groups thereof, a calling station having means for producing and transmitting messages each including a grouping code signal for selecting a predetermined group of said address signals and a signal representing a desired quantity of each of the inventory items of the selected group, means associated with said signal storage equipment for temporarily storing the signals of each incoming message, means including signal recording and read-out devices for scanning said signal storage sections in continuous succession, means including address selection circuits controlled by said stored grouping signal for locating and reading out from one of said group address storage sections signals representing the addresses of the inventory items comprising the predetermined group, means for temporarily storing the item address signals as they are read out, item selection and read-out circuits controlled by said temporarily stored item address signals for locating and reading out from said data storage sections signals representing the currently stored inventory values of the corresponding items, means for temporarily storing said inventory signals thus read out, means including a computer jointly controlled by each of the last named signals and the signal representing said desired quantity in the incoming message for determining in succession whether the currently stored inventory value of each of said items of the selected group is at least equal to said desired quantity or is less than said desired quantity, and means controlled in accordance with the results obtained by said computer for indicating at the calling station whether said inventory values of the items of the group either are sufficient or are insufficient to supply the desired quantity specified in the message.

6. A running inventory system comprising signal storage equipment having a plurality of signal bit storage sections for storing data signals respectively representing the current numerical values of a plurality of different items, each of said items representing specific units of inventory, and in which said data storage sections are selectable in different combinations to form variable groups of items which respectively comprise different words of information, said storage equipment having a plurality of other storage sections for storing groups of address signals respectively for locating the data storage sections of the different items, a calling station having means for producing and transmitting messages each including (1) a grouping code signal for effecting a selection of a predetermined variable group of said items, (2) signals representing a desired quantity of each of the items of the predetermined group, and (3) a variable directive signal representing either an availability inquiry as to the inventory status of the items of the predetermined group or a request to effect a change in the inventory values of the items in accordance with said desired quantity, means including magnetic recording and read-out devices for scanning said signal storage sections in successive cycles, means associated with said signal storage equipment for receiving and temporarily storing the signals of each said transmitted message, means including address selection circuits controlled by said stored grouping signal and effective in a plurality of succeeding selecting cycles for locating and reading out from said address storage sections signals representing the addresses of the inventory items comprising said predetermined group, means for temporarily storing the address signals as they are read out, item selection and read-out circuits controlled by said temporarily stored address signals for locating and reading out from said data storage sections signals representing the currently stored inventory values of the corresponding items, means for temporarily storing said inventory signals thus read out, means including a computer jointly controlled by each of the last named signals and signals representing said desired quantity in the received message for determining whether the inventory value of each of said items of the selected group is at least equal to said desired quantity or is less than said desired quantity, means controlled in accordance with the results obtained by said computer for indicating at the calling station whether said inventory values of the items of the group either are sufficient or are insufficient to supply said desired quantity, means including programming equipment controlled by said directive signal and operative to prevent a change in the stored inventory values of the items in response to an availability inquiry and operative to effect a change in the stored inventory values in response to a request for a desired quantity, and means to prevent a change in the stored inventory values if any of them is insufficient to supply said desired quantity.

7. In a data storage system, a continuously rotatable member having a magnetizable periphery and having recording means and read-out means operable to scan on said periphery different ones of a plurality of address tracks on which signals representing inventory addresses are stored and data tracks on which signals representing statistical items respectively relating to said inventory addresses are stored, a plurality of pulse generators the frequencies of which are regulated by the revolution cycles of said member, the pulse output from one of said generators serving to fix the starting time of each cycle, the pulses from others of said generators when counted serving to identify different peripheral arcs of said tracks and different spot recording positions along said tracks, primary selecting means for selecting a particular one of said address tracks for reading out signals representing certain of the inventory addresses stored thereon, secondary selecting means including permutationally settable control relays and a comparator responsive to registered counts of pulses from one of said generators, said selecting means being operable to restrict the address reading operations to a group of inventory address records all confined within a limited arc of said address track, tertiary selecting means for causing signals representing the inventory addresses to be read out one address at a time and the signals representing each address in a different one of a series of revolution cycles of said member, means for storing the signals representing the inventory address obtained in one revolution cycle throughout an immediately following revolution cycle, means including a second comparator responsive to registered counts of pulses from another of said generators and operable to find a matching of the code pattern of the stored address signal with the code pattern of a particular pulse count as registered, and means for reading out and for registering in electronic storage signals representing a series of statistical items from said data tracks, each such reading operation being timed synchronously with the operation of said second comparator.

8. In a data storage system, a continuously rotatable member having a magnetizable periphery and having a plurality of tracks including synchronizing tracks, address tracks on which signals representing inventory addresses are stored and data storage tracks on which signals representing inventory data relating to said inventory addresses are stored; recording-and-read-out heads each positioned adjacent a different one of said tracks; a control station comprising signaling means to transmit an order and answer-back means to receive a reply giving information respecting the execution of that order a programming apparatus for controlling the execution of any order by sequencing the operations therein involved; said apparatus including selecting and gating means the operation of which is variably directed by said signaling means and is under timing control of pulses derived from a scanning of said synchronizing tracks by read-out heads adjacent thereto; means embodied in said apparatus for causing the sequencing of operations to include in one revolution of said rotatable member a read-out and temporary storage of an inventory address signal respecting a single address, and in the next succeeding revolution of said member a read-out and temporary storage of signals representing a single data item as determined by the particular address signal which is then temporarily stored; and means for composing signals to be transmitted by said answer-back means in accordance with the information which is yielded by the execution of the order.

9. In a magnetic recording and read-out system for the storage of signals representing the address codes and numerical inventory values of different items of information, said system having means for generating trains of counting pulses and having scannable pulse record channels on a rotatable magnetic pulse storage unit for storing signals respectively representing said address codes and the inventory values of the items individual thereto, a source of incoming messages respectively including reference code signals each representing the identification of a plurality of predetermined ones of said items to effect different groupings of correlated ones of the items, means including a first timing means controlled by one of said trains of counting pulses and operable in response to the reference code signal in a message for reading out from said magnetic storage unit signals representing predetermined ones of said address codes to form the desired group during a succession of non-consecutive revolutions of the magnetic storage unit, means for temporarily storing the signals representing the address codes thus read out, means including a second timing means controlled by another of said trains of counting pulses and the temporarily stored address code signals and operative to read out signals representing the numerical values of the items comprising the desired group during revolutions of the unit intervening said non-consecutive revolutions, and means for causing the stored signals representing each such numerical item to be selected according to the designation thereof by the signals representing one address code read out during the immediately preceding revolution of the unit.

10. A system for maintaining space reservation records pertaining to vehicular transportation wherein given vehicles traverse a plurality of scheduled journeys portions of which journeys make up a plurality of trips, a catalog storage means adapted to contain indicia representing information correlating scheduled journeys with portions thereof involved in predetermined trips, means for reading the just-mentioned information from the catalog storage means, a main storage means adapted to contain indicia representing information as to space remaining available in each of the said portions of the scheduled journeys, means for reading from the main storage means, and computation means comprising means interconnecting the catalog storage means and main storage means for receiving signals representing information read from the main storage means, and means for preventing computation based on non-pertinent portions of the scheduled journeys whereby signals representing information read from the main storage means regarding only a predetermined trip are subject to computation.

11. A space reservation system comprising first and second storage means located in a central station, each storage means comprising at least a portion of the surface of a magnetizable medium movable in cycles of travel, transducer means operatively associated with each storage means for locating, recording, reading, and altering information in the form of flux cell indicia on the said surfaces, at least one remote operating station, communications means interconnecting the remote operating station and the central station, means comprising register means in the remote station adapted to locate indicia representing a piece of catalog information in the first storage means, means comprising locator means operated by the reading of information from the first storage means to locate indicia representing predetermined information in the second storage means, means associated with the second storage means for reading information therefrom, means for revising signals representing items of available information a predetermined amount, means including reply register means located at the remote station for indicating the revised items of available information, and means for comparing signals representing the revised items of available information with signals representing reference information to provide an indication in the reply register means if the revised items of available information have exceeded predetermined limits.

12. A system as in claim 11 wherein the first and second storage means are on a single magnetizable member.

13. An inventory data storage and computation apparatus comprising cyclic storage means having address and stored indicia therein, computation means, and means comprising first transducer means interconnecting the storage and computation means for conveying signals representing selected items of said stored indicia to said computation means for computation thereon; register and second transducer means for establishing part of the address of desired items of stored indicia, the address being common to a group of items, sequence and third transducer means for establishing the remainder of the address for indicia of individual items within said group, and means for advancing the sequence means following computation upon each selected item to sequentially perform computation upon each item of said group.

14. A data storage system comprising a catalog storage means and a main storage means for storing indicia representing information, means for revolving said catalog and main storage means in cycles of travel to provide rapid access time, means for locating and reading said indicia information from the main storage and from the catalog storage means, the catalog storage means being arranged to contain indicia representing information for addressing indicia representing information contained in the main storage means, and portions of complete means controlled by signals representing the reading of address information indicia from the catalog storage means for initiating locating and reading from the main storage means only said addressed portions of said complete information indicia, and further including computing means for revising said signals representing information read from the main storage means, the arrangement being such that operation of the computing means is limited to said indexed portion of said complete information read from the main storage means.

15. A data storage system wherein indicia relating to a plurality of individual items is stored and where access to the indicia is desired in terms of a plurality of predetermined groups made up of variably selected individual items, such that a particular individual item may be included in several different groups; means for indicating a particular group, first memory storage means wherein is stored addresses of the indicia relating to the individual items which comprise each particular group, means responsive to said group indicating means operative to read out of said first memory storage means the addresses of the indicia relating to the individual items which comprise the indicated group, second memory storage means wherein is stored the indicia relating to the said individual items each indicium being indexed according to a particular address corresponding to its location in said second memory storage means, means associated with said second memory storage means responsive to the addresses read out from said first memory storage means to read out the corresponding individual item indicia from the second memory storage means, and register means for registering the indicia so read out.

16. A system according to claim 15 and wherein the indicia relating to individual items is a coded numerical quantity, indicator means for indicating a desired numerical quantity, computer means adapted to compare the desired numerical quantity with the numerical quantities of the individual items as registered in said register means, and means responsive to said computer means to indicate the results of said comparison.

17. An information storage system comprising a storage medium having a plurality of data storage areas for storing signals representing different items, each of said items representing specific units of inventory, and concerning which a plurality of correlated items are selectable to form different groups of items, which items respectively comprise different words of information, said storage medium having address storage areas for storing a plurality of address code signals respectively individual to said data storage areas, recording and reading devices and means for scanning said storage areas during successive scanning periods, means for generating trains of timing pulses in synchronism with said scanning, a source of incoming messages each including a variable reference code signal for selecting a particular group of correlated ones of said inventory items and other signals representing a quantity which if entered in the corresponding data storage areas would effect a change in the inventory values of the signals stored in said storage areas, means jointly controlled by said reference code signal and said timing pulses for successively locating and reading out from said address storage areas in successive scanning periods and temporarily storing certain of said address code signals as determined by said reference code signal, means controlled jointly by the temporarily stored address code signals thus read out and by said timing pulses for successively locating and reading out from the corresponding item storage areas the signals representing the inventory items that comprise the group relating to the desired items, and means responsive jointly to the inventory items thus read out and said other signals representing a quantity change in the incoming message for computing, correlating and indicating the results of the information represented by said signals.

18. A running inventory system comprising signal storage equipment having storage sections for storing code signals respectively representing the current numerical quantitative values of a number of different items, each of said items representing specific units of inventory, and in which said storage sections are selectable in different combinations to form variable groups of items, a calling station having means for producing and transmitting messages each including selection code signals for effecting a selection of a predetermined variable combination of a plurality of said inventory items to form a desired group of such items and signals representing a desired quantity of each of the inventory items of said desired group, means associated with said signal storage equipment for temporarily storing said selection code and quantity signals of the incoming message, means including recording and read-out devices for scanning said storage sections in continuous succession and item selection and read-out circuits controlled by the temporarily stored selection code signals for locating and reading out from said storage sections signals representing the currently stored inventory values of the items of the selected group, means for temporarily storing said inventory signals thus read out, means including a computer jointly controlled by each of the last named signals and the temporarily stored signals representing said desired quantity in the incoming message for determining whether the currently stored inventory values of each of said items of the selected group is at least equal to said desired quantity or is less than said desired quantity, and means controlled in accordance with the results obtained by said computer for indicating at the calling station whether said inventory values of the items of the group either are sufficient or are insufficient to supply the desired quantity specified in the message.

19. A running inventory system comprising signal storage equipment having storage sections for storing code signals respectively representing the current numerical quantitative values of a number of different inventory items, and in which said code signals are selectable in different combinations to form variable groups of inventory items which respectively comprise different words of information, said storage equipment having a plurality of other storage sections for storing different predetermined groups of address signals respectively representing the location of a plurality of code signals representing memory items in different variable groups thereof, a calling station having means for producing and transmitting messages each including a grouping code signal for selecting a predetermined group of said address signals and a signal representing a desired quantity of each of the inventory items of the selected group, means associated with said signal storage equipment for temporarily storing the signals of each incoming message, means including recording and read-out devices for scanning said storage sections in continuous succession, means including address selection circuits controlled by said stored grouping signal for locating and reading out from the address storage section signals representing the addresses of the code signals representing inventory items comprising the predetermined group, means for temporarily storing the item address signals as they are read out, inventory item selection and read-out circuits controlled by said temporarily stored item address signals for locating and reading out from said data storage sections code signals representing the currently stored inventory values of the corresponding items, means for temporarily storing said inventory signals thus read out, means including a computer jointly controlled by each of the last named signals and the signal representing said desired quantity in the incoming message for determining in succession whether the currently stored inventory value of each of said items of the selected group is at least equal to said desired quantity or is less than said desired quantity, and means controlled in accordance with the results obtained by said computer for indicating at the calling station whether said inventory values of the items of the group either are sufficient or are insufficient to supply the desired quantity specified in the message.

20. A space reservation system comprising first and second storage means located in a central station, means operatively associated with each storage means for locating, recording, reading, and altering information therein, at least one remote operating station, means interconnecting the remote operating station and the central station, means comprising register means in the remote station adapted to locate indicia representing a piece of catalog information in the first storage means, means comprising locator means operated by the reading of indicia representing information from the first storage means to locate indicia representing predetermined information in the second storage means, means associated with the second storage means for reading indicia representing information therefrom, means for revising the items of available information a predetermined amount, and means including reply register means located at the remote station for indicating signals representing the revised items of available information.

21. A space reservation system comprising first and second storage means located in a central station, means operatively associated with each storage means for locating, recording, reading, and altering information in said storage means, at least one remote operating station, communications means interconnecting the remote operating station and the central station, means comprising register means in the remote station adapted to locate indicia representing a piece of catalog information in the first storage means, means comprising locator means operated by the reading of signals representing information from the first storage means to locate indicia representing information in the second storage means, means associated with the second storage means for reading indicia representing information therefrom, means for revising the items of available information a predetermined amount, means including reply register means located at the remote station for indicating signals representing the revised items of available information, and means arranged to search through indicia representing a predetermined number of catalog items in the first storage means and to provide signals representing replies in the reply register means for each item searched in the first storage means.

22. A data storage system comprising a catalog storage means and a main storage means for storing indicia representing information, means for locating and reading said indicia information from the main storage and from the catalog storage means, the catalog storage means being arranged to contain indicia representing information for addressing indicia representing information contained in the main storage means, and means controlled by signals representing the reading of address information indicia from the catalog storage means for initiating locating and reading from the main storage means only said addressed portions of said information indicia.

References Cited in the file of this patent

UNITED STATES PATENTS

| | | |
|---|---|---|
| 2,652,554 | Williams et al. | Sept. 15, 1953 |
| 2,737,342 | Nelson | Mar. 6, 1956 |
| 2,879,000 | MacDonald et al. | Mar. 24, 1959 |
| 2,901,603 | Weill et al. | Aug. 25, 1959 |
| 2,910,238 | Miles et al. | Oct. 27, 1959 |
| 2,947,865 | Estrems et al. | Aug. 2, 1960 |